US011167249B2

(12) United States Patent
Koiwa et al.

(10) Patent No.: US 11,167,249 B2
(45) Date of Patent: Nov. 9, 2021

(54) SEPARATION MEMBRANE, SEPARATION MEMBRANE ELEMENT, WATER PURIFIER, AND METHOD FOR PRODUCING SEPARATION MEMBRANE

(71) Applicant: TORAY INDUSTRIES, INC., Tokyo (JP)

(72) Inventors: Masakazu Koiwa, Shiga (JP); Ryoma Miyamoto, Shiga (JP); Hiroaki Tanaka, Shiga (JP); Koji Nakatsuji, Ehime (JP); Kentaro Takagi, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/748,981

(22) PCT Filed: Jul. 29, 2016

(86) PCT No.: PCT/JP2016/072429
§ 371 (c)(1),
(2) Date: Jan. 30, 2018

(87) PCT Pub. No.: WO2017/022694
PCT Pub. Date: Feb. 9, 2017

(65) Prior Publication Data
US 2018/0318771 A1    Nov. 8, 2018

(30) Foreign Application Priority Data

Jul. 31, 2015  (JP) .............................. JP2015-151733
Mar. 30, 2016  (JP) .............................. JP2016-069547
Mar. 30, 2016  (JP) .............................. JP2016-069548

(51) Int. Cl.
*B01D 69/10*    (2006.01)
*B01D 71/56*    (2006.01)
(Continued)

(52) U.S. Cl.
CPC ........... *B01D 69/10* (2013.01); *B01D 53/228* (2013.01); *B01D 61/18* (2013.01); *B01D 69/02* (2013.01);
(Continued)

(58) Field of Classification Search
None
See application file for complete search history.

(56) References Cited

U.S. PATENT DOCUMENTS 4,259,183 A * 3/1981 Cadotte ................ B01D 69/125
                                              210/500.28
4,277,377 A * 7/1981 Webb .................... C11B 9/0023
                                                      512/6

(Continued)

FOREIGN PATENT DOCUMENTS

CN    102762287 A    10/2012
CN    103842062 A    6/2014
(Continued)

OTHER PUBLICATIONS

International Search Report, issued in PCT/JP2016/072429, PCT/ISA/210, dated Oct. 25, 2016.
(Continued)

*Primary Examiner* — Ana M Fortuna
(74) *Attorney, Agent, or Firm* — Birch, Stewart, Kolasch & Birch, LLP

(57) ABSTRACT

An object of the present invention is to provide a separation membrane having high permeability and selective removability of divalent/monovalent ions. The separation membrane of the present invention includes a supporting membrane and a separation functional layer formed on the supporting membrane, in which the separation functional layer contains a polymerized product of a polyfunctional amine with a polyfunctional acid halide, the polyfunctional
(Continued)

amine contains a polyfunctional aliphatic amine as a main component, the separation functional layer has a hollow protuberant structure, and the separation functional layer has a relative surface area of 1.1-10.0.

14 Claims, 3 Drawing Sheets

(51) Int. Cl.
*B32B 5/18* (2006.01)
*B01D 53/22* (2006.01)
*B01D 61/18* (2006.01)
*B01D 69/02* (2006.01)
*B01D 69/12* (2006.01)
*B01D 61/02* (2006.01)
*B01D 71/34* (2006.01)
*B01D 71/68* (2006.01)
*B32B 27/12* (2006.01)

(52) U.S. Cl.
CPC ........... *B01D 69/125* (2013.01); *B01D 71/56* (2013.01); *B32B 5/18* (2013.01); *B01D 61/02* (2013.01); *B01D 61/025* (2013.01); *B01D 69/12* (2013.01); *B01D 71/34* (2013.01); *B01D 71/68* (2013.01); *B01D 2323/08* (2013.01); *B01D 2323/48* (2013.01); *B01D 2325/06* (2013.01); *B01D 2325/20* (2013.01); *B01D 2325/36* (2013.01); *B32B 27/12* (2013.01)

(56) References Cited

U.S. PATENT DOCUMENTS

| | | | |
|---|---|---|---|
| 4,758,343 A | | 7/1988 | Sasaki et al. |
| 4,761,324 A | * | 8/1988 | Rautenberg ............ A41D 31/02 428/198 |
| 4,857,363 A | | 8/1989 | Sasaki et al. |
| 5,160,619 A | * | 11/1992 | Yamaguchi .......... B01D 69/125 210/500.38 |
| 5,658,460 A | * | 8/1997 | Cadotte .............. B01D 67/0095 210/490 |
| 5,674,398 A | * | 10/1997 | Hirose ................. B01D 69/125 210/490 |
| 5,989,426 A | | 11/1999 | Hirose et al. |
| 6,406,626 B1 | * | 6/2002 | Murakami ............. B01D 69/00 210/500.37 |
| 6,413,425 B1 | * | 7/2002 | Hachisuka ......... B01D 67/0088 210/500.38 |
| 2003/0098272 A1 | * | 5/2003 | Marsh .................... B01D 63/10 210/321.74 |
| 2009/0050558 A1 | * | 2/2009 | Ishizuka ................ B01D 71/56 210/500.21 |
| 2012/0305473 A1 | * | 12/2012 | Ogawa ................... B01D 69/02 210/500.38 |
| 2013/0037482 A1 | * | 2/2013 | Kamada ................ B01D 69/02 210/500.38 |
| 2014/0231338 A1 | * | 8/2014 | Takaya ................... B01D 71/56 210/489 |
| 2014/0353242 A1 | * | 12/2014 | Kim ....................... B01D 69/02 210/500.38 |
| 2016/0045873 A1 | * | 2/2016 | Paul ................... B01D 67/0006 427/244 |
| 2016/0243503 A1 | * | 8/2016 | Okabe ..................... B01D 69/02 |
| 2017/0326506 A1 | * | 11/2017 | Tokuyama ............. B01D 69/10 |
| 2018/0318771 A1 | * | 11/2018 | Koiwa ................... B01D 69/10 |
| 2019/0209975 A1 | * | 7/2019 | Ali ......................... B01D 69/02 |
| 2020/0188861 A1 | * | 6/2020 | Hamada ................. B01D 71/82 |
| 2020/0261860 A1 | * | 8/2020 | Miyabe ................. B01D 69/10 |
| 2021/0049051 A1 | * | 2/2021 | Ichimaru ............... G06F 9/5044 |

FOREIGN PATENT DOCUMENTS

| | | |
|---|---|---|
| EP | 0313354 A1 | 4/1989 |
| EP | 2540385 A1 | 1/2013 |
| JP | 62-201606 A | 9/1987 |
| JP | 1-38522 B2 | 8/1989 |
| JP | 9-19630 A | 1/1997 |
| JP | 2001-179061 A | 7/2001 |
| JP | 2005-169332 A | 6/2005 |
| JP | 2007-277298 A | 10/2007 |
| JP | 2010-137192 A | 6/2010 |
| JP | 2014-65004 A | 4/2014 |
| JP | 2014-233652 A | 12/2014 |
| JP | 2015-27666 A | 2/2015 |
| JP | 2015-85322 A | 5/2015 |
| WO | WO 2010/109490 A1 | 9/2010 |
| WO | WO 2014/104241 A1 | 7/2014 |

OTHER PUBLICATIONS

Written Opinion of the International Searching Authority, issued in PCT/JP2016/072429, PCT/ISA/237, dated Oct. 25, 2016.
Extended European Search Report, dated Mar. 4, 2019, for European Application No. 16832973.8.
European Office Communication for European Application No. 16832973.8, dated Dec. 2, 2019.
Chinese Office Action and English translation for Chinese Application No. 201680044898.X, dated Aug. 20, 2020.
Chinese Office Action and Search Report for Chinese Application No. 201680044898.X, dated Apr. 3, 2020, with English translation.
Japanese Office Action for Japanese Application No. 2016-572345, dated Apr. 21, 2020, with English translation.
Chinese Office Action for Chinese Application No. 201630044898. X, dated Feb. 26, 2021, with English translation.

* cited by examiner

SEPARATION MEMBRANE, SEPARATION MEMBRANE ELEMENT, WATER PURIFIER, AND METHOD FOR PRODUCING SEPARATION MEMBRANE

TECHNICAL FIELD

The present invention relates to a separation membrane and a separation membrane element which are for selectively separating divalent ions from a solution of a mixture of monovalent ions and divalent ions, in particular, a separation membrane and a separation membrane element which are applicable to domestic water purifiers, and further relates to a water purifier including with the separation membrane element and a process for producing the separation membrane.

BACKGROUND ART

With respect to separation of a mixture, there are various techniques for removing substances (e.g., salts) dissolved in a solvent (e.g., water). Membrane separation methods are spreading recently as processes for energy saving and resource saving. Examples of the membranes for use in the membrane separation methods include microfiltration membranes, ultrafiltration membranes, nanofiltration membranes, and reverse osmosis membranes. These membranes are used, for example, for producing potable water from seawater, brackish water, or water containing a harmful substance, for softening potable water, in food applications, for producing industrial ultrapure water, for wastewater treatment, and for recovery of valuables, etc.

Separation techniques employing such membrane separation methods are required to attain higher permeability for a further reduction in running cost. In the case where separation membranes are used, for example, for softening potable water, in food applications, or for recovering valuables, solute-removing properties and selectively solute-removing properties also are important performances. Divalent-ion-removing performance and the property of selectively removing divalent ions are used as indices thereto.

For a method for selective removal with a membrane, for example, Patent Document 1 disclosed a method employing a composite nanofiltration membrane constituted of a polyamide obtained by reacting a polyfunctional aromatic carboxylic acid chloride with a diamine ingredient which is either piperazine or a combination of piperazine and 4,4'-bipepiridine.

Patent Documents 2 to 4 disclosed techniques for separating monovalent ions from divalent ions, by employing a composite reverse osmosis membrane obtained by reacting piperazine with trimesoyl chloride.

BACKGROUND ART DOCUMENTS

Patent Documents

Patent Document 1: JP-A-2007-277298
Patent Document 2: JP-B-1-38522
Patent Document 3: JP-A-2010-137192
Patent Document 4: JP-A-62-201606

SUMMARY OF THE INVENTION

Problem that the Invention is to Solve

However, the nanofiltration membranes and reverse osmosis membranes described in Patent Documents 1 to 3 are insufficient in permeability.

In addition, the semipermeable membrane described in Patent Document 4 is insufficient in the property of selectively removing divalent ions.

Accordingly, an object of the present invention is to provide a separation membrane excellent in terms of permeability and the property of selectively removing divalent ions.

Means for Solving the Problem

The present inventors diligently made investigations in order to accomplish the object and, as a result, have found that a separation membrane excellent in terms of permeability and the property of selectively removing divalent ions is obtained by configuring the separation membrane so as to include a separation functional layer which is a separation functional layer with protuberances constituted of a polymerized product of a polyfunctional aliphatic amine with a polyfunctional acid halide and which has a specific value of relative surface area. Specifically, the present invention has the following configurations <1> to <14>.

<1> A separation membrane including:
 a supporting membrane; and
 a separation functional layer formed on the supporting membrane,
 in which the separation functional layer includes a polymerized product of a polyfunctional amine with a polyfunctional acid halide,
 the polyfunctional amine includes a polyfunctional aliphatic amine as a main component,
 the separation functional layer has a hollow protuberant structure, and
 the separation functional layer has a relative surface area of 1.1-10.0.

<2> The separation membrane according to <1>, in which the protuberant structure has an average number density of protuberances of 5-300 protuberances per $\mu m^2$.

<3> The separation membrane according to <2>, in which the polyfunctional aliphatic amine has a log P of −1.0 to 0.0.

<4> The separation membrane according to <3>, in which the polyfunctional aliphatic amine is a piperazine compound represented by the following general formula (1):

[Chem. 1]

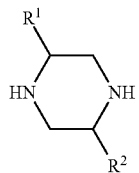

(1)

(in which $R^1$ represents an alkyl group having 1-6 carbon atoms, a phenyl group, a benzyl group, $COOR^3$, $CONHR^3$, $CON(R^3)_2$, or $OR^3$, where $R^3$ represents a hydrogen atom, an alkyl group having 1-6 carbon atoms, a phenyl group, or a benzyl group, and $R^2$ represents a hydrogen atom, an alkyl group having 1-6 carbon atoms, a phenyl group, a benzyl group. $COOR^4$, $CONHR^4$, $CON(R^4)_2$, or $OR^4$, where $R^4$ represents a hydrogen atom, an alkyl group having 1-6 carbon atoms, a phenyl group, or a benzyl group).

<5> The separation membrane according to any one of <1> to <4>, in which the separation functional layer has zeta-potentials respectively at pH 4 and pH 9, the absolute values of the zeta-potentials each being 20 mV or less.

<6> The separation membrane according to <5>, in which, in the separation functional layer, amino groups and amide groups which are derived from the polyfunctional aliphatic amine and carboxy groups and amide groups which are derived from the polyfunctional acid halide are present in a ratio that satisfies the following expression (2).

$$0.8 \leq (\text{number of moles of amino groups and amide groups derived from polyfunctional aliphatic amine})/(\text{number of moles of carboxy groups and amide groups derived from polyfunctional acid halide}) \leq 1.2 \quad (2)$$

<7> A separation membrane element including:
  a collecting pipe;
  a separation membrane having a feed-side surface and a penetration-side surface;
  a feed-side channel member disposed between portions of the feed-side surface of the separation membrane; and
  a permeation-side channel member disposed between portions of the permeation-side surface of the separation membrane,
  in which the separation membrane is the separation membrane according to any one of <1> to <6>.

<8> The separation membrane element according to <7>, in which in cases when saline water having a temperature of 25° C., a pH of 7, and an MgSO$_4$ concentration of 2,000 mg % L is used and filtrated so as to result in a recovery ratio of 15%, at a feeding pressure (MPa) which satisfies the following expression (3) concerning relationship with effective membrane area (m$^2$), then the filtration results in a permeate flow rate of 1.0 L/min or higher and an MgSO$_4$ removal ratio of 90% or higher.

$$(\text{Effective membrane area (m}^2))\times(\text{feeding pressure (MPa)}) \leq 0.3 \quad (3)$$

<9> The separation membrane element according to <7> or <8>, in which the effective membrane area is 0.3-3.0 m$^2$.

<10> The separation membrane element according to any one of <7> to <9>, in which the permeation-side channel member is either a sheet obtained by disposing projections on a porous sheet or a rugged sheet which has undergone ruggedness-imparting processing.

<11> A water purifier including the separation membrane element according to any one of <7> to <10>.

<12> A process for producing a separation membrane, the process including:
  a formation step in which a separation functional layer is formed on a supporting membrane by interfacial polycondensation between an aqueous solution of a polyfunctional aliphatic amine and a solution containing a polyfunctional acid halide,
  the formation step including:
  a step in which the polyfunctional aliphatic amine and the polyfunctional acid halide are brought into contact with each other at 40-70° C.; and
  a step in which the polyfunctional aliphatic amine and the polyfunctional acid halide are caused to undergo interfacial polycondensation with each other at −5° C. to 25° C.

<13> The process for producing a separation membrane according to <2>, in which the aqueous solution of the polyfunctional aliphatic amine has a pH of 8.5-11.0.

<14> The process for producing a separation membrane according to <12> or <13>, in which the polyfunctional aliphatic amine has a log P of −1.0 to 0.0.

<15> The process for producing a separation membrane according to <14>, in which the polyfunctional aliphatic amine is a piperazine compound represented by the following general formula (1):

[Chem. 2]

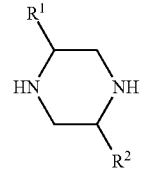

(1)

(in which R$^1$ represents an alkyl group having 1-6 carbon atoms, a phenyl group, a benzyl group, COOR$^3$, CONHR$^3$, CON(R$^3$)$_2$, or OR$^3$, where R$^3$ represents a hydrogen atom, an alkyl group having 1-6 carbon atoms, a phenyl group, or a benzyl group, and R$^2$ represents a hydrogen atom, an alkyl group having 1-6 carbon atoms, a phenyl group, a benzyl group. COOR$^4$, CONHR$^4$, CON(R$^4$)$_2$, or OR$^4$, where R$^4$ represents a hydrogen atom, an alkyl group having 1-6 carbon atoms, a phenyl group, or a benzyl group).

Advantage of the Invention

The separation membrane of the present invention is excellent in terms of permeability and the property of selectively removing divalent ions. Because of this, salt removal from and mineral regulation of brackish water or seawater, salt removal and mineral regulation in the field of foods, concentration of solutes, and the like can be performed with this separation membrane while attaining a greater saving of energy than with conventional separation membranes.

MODE FOR CARRYING OUT THE INVENTION

1. Separation Membrane

The separation membrane of the present invention includes a supporting membrane and a separation functional layer formed on the supporting membrane.

Figure 1:
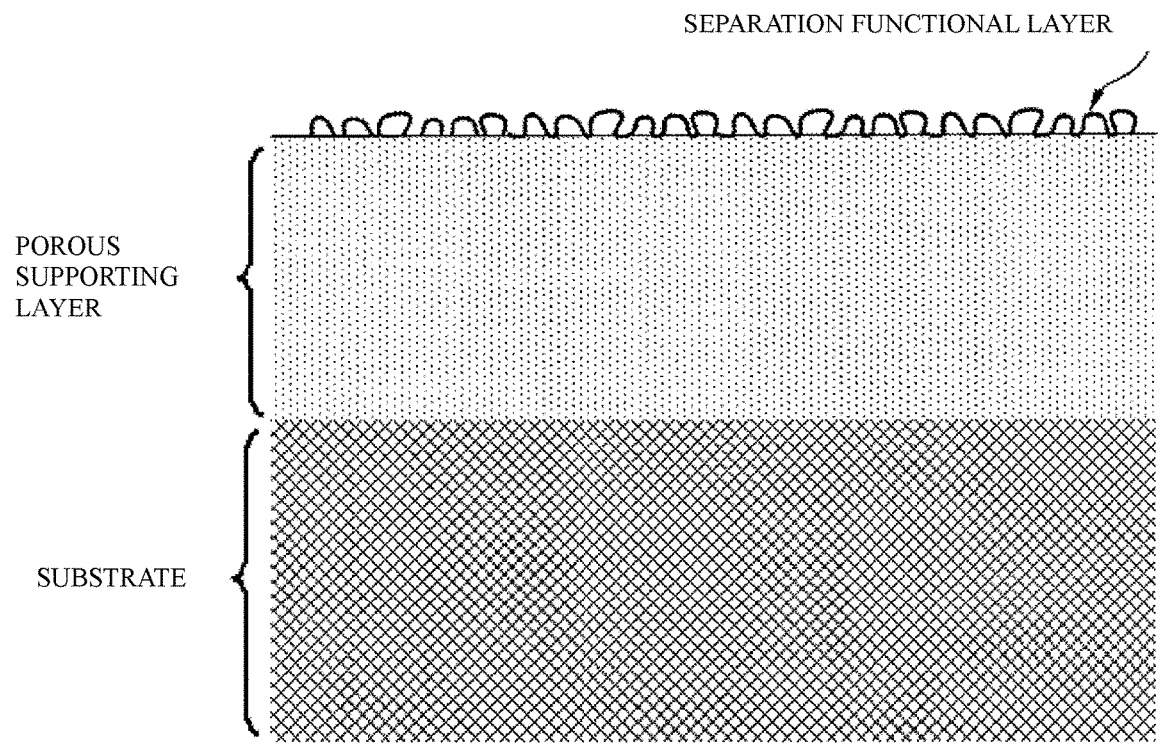
FIG. 1 is a view showing a cross-section of a separation membrane of the present invention.

In one embodiment, the supporting membrane includes a substrate and a porous supporting membrane including a porous supporting layer, as shown in FIG. 1. The separation functional layer is formed on the porous supporting membrane.

In general, the factors which affect the permeability of a separation membrane are thought to include properties of the separation functional layer, such as the pore diameter, thickness, relative surface area, affinity for solvents and solutes, and electric charge. The present inventors directed attention especially to the thickness and relative surface area of the separation functional layer.

In this description, "relative surface area" is the ratio of the surface area of the separation functional layer to the surface area of the porous supporting layer, and indicates the degree of the size of the protuberant structure and the degree of the number of protuberances. The larger the relative surface area, the higher the permeability. Conventional separation membranes constituted from a separation functional layer including a polymerized product of a polyfunctional aliphatic amine with a polyfunctional acid halide is excellent in terms of the property of selectively removing divalent ions, but have been regarded as having difficulties in formation of a protuberant structure and an improvement in permeability by an increase in relative surface area has not been attained. The present inventors diligently made investigations and, as a result, have found that a separation functional layer which includes a polymerized product of a polyfunctional aliphatic amine with a polyfunctional acid halide and which is a layer with protuberances having a relative surface area of 1.1 or larger gives a separation membrane that is excellent in terms of permeability and the property of selectively removing divalent ions.

(1-1) Separation Functional Layer

The separation functional layer is a layer which, in the separation membrane, performs the function of separating solutes. In the present invention, the separation functional layer includes a crosslinked polyamide as the main component.

The proportion of the crosslinked polyamide in the separation functional layer is preferably 90% by weight or higher, more preferably 95% by weight or higher. The separation functional layer may be constituted substantially of the crosslinked polyamide only.

Specifically, the crosslinked polyamide is a polymerized product of a polyfunctional amine with a polyfunctional acid halide. The polyfunctional amine includes a polyfunctional aliphatic amine as a main component. Namely, the crosslinked polyamide contains components derived from a polyfunctional amine (hereinafter simply referred to as "amine components") and components derived from a polyfunctional acid halide (hereinafter simply referred to as "halide components"), and the amine components contained in the crosslinked polyamide are mainly accounted for by a component derived from a polyfunctional aliphatic amine. Hereinafter, "crosslinked polyamide" is sometimes referred to simply as "polyamide".

It is preferable that the component derived from a polyfunctional aliphatic amine should account for at least 90% by mole of the amine components contained in the crosslinked polyamide. The proportion of the component derived from a polyfunctional aliphatic amine in the amine components is more preferably 95% by mole or higher, even more preferably 99% by mole or higher.

Examples of the amine components other than the polyfunctional aliphatic amine in the crosslinked polyamide include polyfunctional aromatic amines.

The polyfunctional aliphatic amine is an aliphatic amine having two or more amino groups in a molecule. It is preferable that the polyfunctional aliphatic amine should have a log P of −1.0 to 0.0. Here, log P is the common logarithm of octanol-water distribution coefficient, and is a value determined in accordance with JIS Z 7260-107.

The crosslinked polyamide is obtained by interfacial polycondensation of a polyfunctional amine with a polyfunctional acid halide.

It has been known for long that the interfacial polymerization for polyamide formation proceeds when the amine is distributed and diffused in an organic phase and reacts with the polyfunctional acid halide in the organic phase (document P. W. Morgan. S. L. Kwolek, J. Polymer. Sci., 299-327 (1959)). When the polyfunctional aliphatic amine has a log P of −1.0 to 0.0, the distribution and diffusion of the polyfunctional aliphatic amine in the organic solvent during the interfacial polycondensation is optimized to facilitate the formation of a separation functional layer with protuberances.

The polyfunctional aliphatic amine is preferably a derivative of a piperazine-based amine.

Examples of piperazine-based amines having a log P of −1.0 to 0.0 include piperazine compounds represented by the following general formula (1).

[Chem. 3]

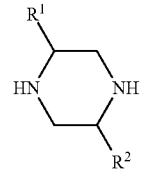

(1)

In general formula (1), $R^1$ represents an alkyl group having 1-6 carbon atoms, a phenyl group, a benzyl group, $COOR^3$, $CONHR^3$, $CON(R^3)_2$, or $OR^3$, where $R^3$ represents a hydrogen atom, an alkyl group having 1-6 carbon atoms, a phenyl group, or a benzyl group. Meanwhile, $R^2$ represents a hydrogen atom, an alkyl group having 1-6 carbon atoms, a phenyl group, a benzyl group, $COOR^4$, $CONHR^4$, $CON(R^4)_2$, or $OR^4$, where $R^4$ represents a hydrogen atom, an alkyl group having 1-6 carbon atoms, a phenyl group, or a benzyl group.

Specific examples of the piperazine compounds represented by formula (1) include 2,5-dimethylpiperazine, 2-methylpiperazine, 2,6-dimethylpiperazine, 2,3,5-trimethylpiperazine, 2-ethylpiperazine, 2,5-diethylpiperazine, 2,3,5-triethylpiperazine, 2-n-propylpiperazine, and 2,5-di-n-butylpiperazine. These polyfunctional aliphatic amines may be used alone, or a mixture of two or more thereof may be used.

More preferred of such piperazine compounds are ones having a substituent at the 2- or 5-position, such as 2,5-dimethylpiperazine, 2-methylpiperazine, 2-ethylpiperazine, 2,5-diethylpiperazine, 2-n-propylpiperazine, and 2,5-di-n-butylpiperazine.

The polyfunctional acid halide is an acid halide having two or more halogenocarbonyl groups in a molecule, and is not particularly limited so long as the acid halide reacts with the amine to give a polyamide. As the polyfunctional acid halide, for example, a halide of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxlic acid, 1,3,5-benzenetricarboxylic acid, 1,2,4-benzenetricarboxylic acid, 1,3-benzenedicarboxylic acid, 1,4-benzenedicarboxylic acid, or the like can be used.

Among these acid halides, acid chlorides are preferred. In particular, trimesoyl chloride, isophthaloyl chloride, and terephthaloyl chloride, which are acid halides of 1,3,5-benzenetricarboxylic acid, 1,3-benzenedicarboxylic acid, and 1,4-benzenedicarboxylic acid, are preferred from the standpoints of profitability, availability, handleability, ease of reaction, etc. One of these polyfunctional acid halides may be used alone, or a mixture of two or more thereof may be used.

The separation functional layer in the present invention has a protuberant structure constituted of a thin membrane. The term "protuberant structure of the separation functional layer" means a hollow structure which is observed in an image obtained by examining a cross-section of the polyamide functional layer with a scanning electron microscope (SEM, FE-SEM), transmission electron microscope (TEM), or the like and in which "(protuberance height of the separation functional layer)/(thin-membrane thickness of the separation functional layer)" is larger than 1.1. The value of "(protuberance height of the separation functional layer)/(thin-membrane thickness of the separation functional layer)" is preferably 2.0 or larger, more preferably 3.0 or larger.

Figure 2:
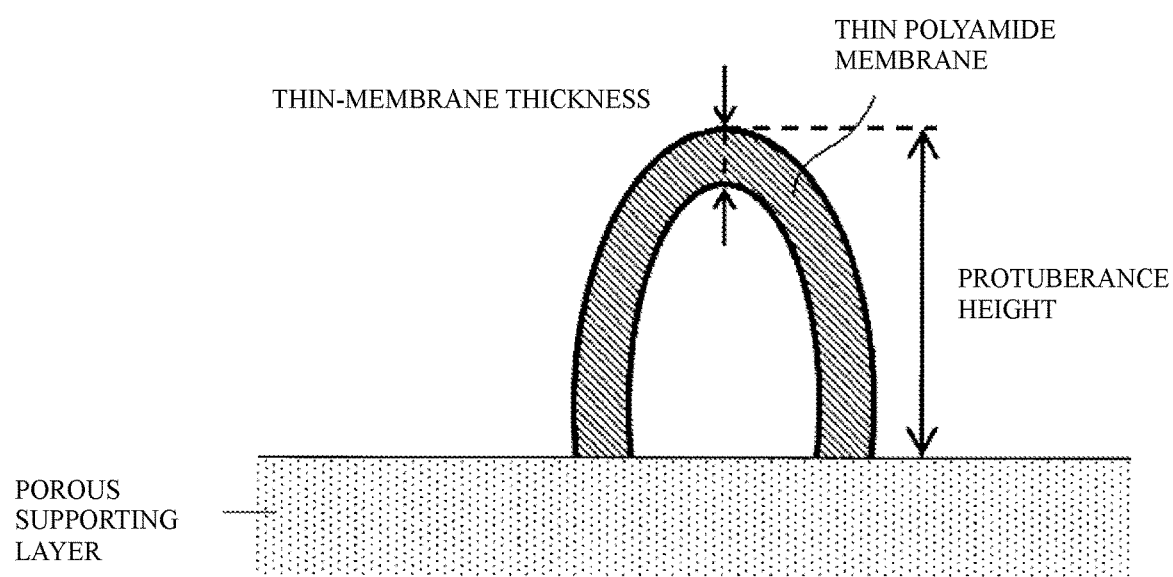
FIG. 2 is a view showing a cross-section of the protuberant structure of the separation functional layer of a separation membrane of the present invention.

The "thin-membrane thickness of the separation functional layer" is the length of a line segment which, in the image of a cross-section of the polyamide functional layer, connects a point on the feed-water-side surface of the separation functional layer to the nearest point on the permeate-side surface thereof, and corresponds to the length indicated by the "thin-membrane thickness" in FIG. 2. The cross-sectional image of the polyamide functional layer is divided into ten sections and the point on the feed-water-side surface which is most apart from the supporting membrane in each section is taken as the measuring point on the feed-water-side surface. When the separation functional layer has a protuberant structure and the protuberant structure has been formed so as to lie over sections, then the section where the feed-water-side surface has a larger distance from the supporting membrane is used for the measuring point.

The thin-membrane thickness of the separation functional layer is preferably 10 nm or larger, more preferably 15 nm or larger. When the thin-membrane thickness is 10 nm or larger, a composite semipermeable membrane having sufficient permeability can be easily obtained. When the thin-membrane thickness is 15 nm or larger, a composite semipermeable membrane having sufficient permeability can be stably obtained without causing a decrease in removing property due to defect occurrence.

Meanwhile, the thin-membrane thickness of the separation functional layer is preferably 100 nm or less, more preferably 50 nm or less, even more preferably 30 nm or less. When the thin-membrane thickness is 100 nm or less, stable membrane performance can be obtained. When the thin-membrane thickness is 80 nm or less, sufficient permeability and stable membrane performances can be obtained. Furthermore, when the thin-membrane thickness is 30 nm or less, the separation functional layer can have more sufficient permeability and retain stable membrane performances.

The "protuberance height of the separation functional layer" is as follows. A line perpendicular to the surface of the supporting membrane is drawn from the feed-water-side point used for measuring the thickness of the polyamide functional layer, and the length of the line segment which connects that point to the intersection of the perpendicular and the supporting-membrane surface is taken as the "protuberance height of the separation functional layer". This length corresponds to the length indicated by the "protuberance height" in FIG. 2.

The protuberance height of the separation functional layer is preferably 20 nm or larger, more preferably 50 nm or larger. When the protuberance height is 20 nm or larger, a composite semipermeable membrane having sufficient permeability can be easily obtained.

Meanwhile, the protuberance height of the separation functional layer is preferably 1,000 nm or less, more preferably 800 nm or less, even more preferably 300 nm or less. When the protuberance height is 1,000 nm or less, the protuberances do not collapse even when the composite semipermeable membrane is used in a high-pressure operation. When the protuberance height is 800 nm or less, stable membrane performance can be obtained. Furthermore, when the protuberance height is 300 nm or less, the stable membrane performance can be maintained over a long period.

The "relative surface area of the separation functional layer" is the ratio of the "surface area of the separation functional layer" to the "surface area of the porous supporting membrane". The term "surface area of the separation functional layer" means the surface area of that surface of the separation functional layer which comes into contact with a feed liquid. Meanwhile, the term "surface area of the porous supporting membrane" means the surface area of the surface which is in contact with the separation functional layer. The surface areas and relative surface area can be determined in accordance with methods generally used for determining surface areas or relative surface areas, and are not particularly limited in methods for determination thereof.

Examples of usable measuring apparatus include a surface area measuring device, relative surface area measuring device (AFM), scanning electron microscope (SEM, FE-SEM), and transmission electron microscope (TEM). A specific example of measuring methods is shown in the Examples.

In the separation membrane of the present invention, the relative surface area of the separation functional layer is 1.1-10.0, preferably 1.5-6.0, more preferably 2.0-5.0.

When the relative surface area of the separation functional layer is 1.1 or larger, this means that the separation functional layer has a protuberant structure and, hence, a separation membrane excellent in terms of permeability and the property of selectively removing divalent ions is obtained.

When the relative surface area of the separation functional layer is 10.0 or less, the protuberant structure does not collapse even when the separation membrane is used in a high-pressure operation. When the relative surface area of the separation functional layer is 6.0 or less, membrane performances less varied can be obtained. Furthermore, when the relative surface area of the separation functional layer is 5.0 or less, stable membrane performances can be maintained over a long period.

The average number density of protuberances of the separation functional layer is preferably 5.0-300.0 protuberances per $\mu m^2$, more preferably 20.0-200.0 protuberances per $\mu m^2$. When the average number density of protuberances thereof is within this range, stable membrane performances (permeability and the property of selectively removing divalent ions) can be maintained over a long period.

Examples of methods for determining the average number density of protuberances include ones employing a surface area measuring device, relative surface area measuring device (AFM), scanning electron microscope (SEM, FE-SEM), transmission electron microscope (TEM), etc.

Partial structures derived from the polyfunctional aliphatic amine and partial structures derived from the polyfunctional acid halide, in the separation functional layer, can be analyzed by peeling the separation functional layer from the porous supporting membrane and examining the peeled layer by $^{13}$C-NMR spectroscopy or by hydrolyzing the peeled layer with a strong alkali aqueous solution and examining the resultant sample by $^1$H-NMR spectroscopy.

It is preferable that the polyamide separation functional layer according to the present invention should have zeta-potentials (absolute values) at pH 4 and pH 9 of 20 mV or less each. The zeta-potentials (absolute values) of the separation functional layer at pH 4 and pH 9 relate to the permeability; in cases when the absolute values of the ζ-potentials are 20 mV or less, the separation membrane has enhanced permeability. Small potential values is thought to mean that the amount of amino groups and carboxy groups is small. The small amount of amino groups and carboxy groups indicates that the polyfunctional aliphatic amine and the polyfunctional acid halide were present in amounts just enough for forming the separation functional layer. Because of this, the water permeation resistance can be reduced while maintaining the property of selectively removing divalent ions, resulting in an improvement in permeability.

Incidentally, zeta-potential can be measured with, for example, an electrophoretic light scattering photometer. For example, the separation membrane is set in a cell for flat-sheet samples so that the surface of the separation functional layer of the separation membrane comes into contact with a solution of monitor particles, and examined. The monitor particles are ones obtained by coating polystyrene latex particles with hydroxypropyl cellulose, and these particles are dispersed in a 10-mM NaCl solution to give the monitor particle solution. By adjusting the pH of the monitor particle solution beforehand, the zeta-potentials at the given values of pH can be measured. As the electrophoretic light scattering photometer, for example, ELS-8000, manufactured by Otsuka Electronics Co., Ltd. can be used It is preferable that in the separation functional layer, the presence ratio in which the amino groups and amide groups that are derived from the polyfunctional aliphatic amine and the carboxy groups and amide groups that are derived from the polyfunctional acid halide are present [(amino groups+amide groups)/(carboxy groups+amide groups)] satisfies the following expression (2).

0.8≤(number of moles of amino groups and amide groups derived from polyfunctional aliphatic amine)/(number of moles of carboxy groups and amide groups derived from polyfunctional acid halide)≤1.2    (2)

That the presence ratio (molar ratio) is 0.8-1.2 is a result showing that during the interfacial polymerization reaction for forming the separation functional layer, the amount of the polyfunctional aliphatic amine distributed and diffused in the organic phase and the amount of the polyfunctional acid halide to be reacted with the polyfunctional aliphatic amine in the organic phase were optimized. The separation functional layer is thereby formed so as to have protuberances.

The presence ratio (molar ratio) is more preferably 0.85 or larger, even more preferably 0.9 or larger, and is more preferably 1.15 or less, even more preferably 1.1 or less.

Examples of methods for controlling the presence ratio between the amino groups and amide groups which are derived from the polyfunctional aliphatic amine and the carboxy groups and amide groups which are derived from the polyfunctional acid halide [(amino groups+amide groups)/(carboxy groups+amide groups)] in the separation functional layer include: a method in which the proportion of the concentration of the polyfunctional aliphatic amine to the concentration of the polyfunctional acid halide during the interfacial polycondensation is regulated; and a method in which the solvent in which the polyfunctional acid halide is to be dissolved is changed.

(1-2) Supporting Membrane

The supporting membrane includes a substrate and a porous supporting membrane disposed on the substrate and constituted of a porous supporting layer. The supporting membrane has substantially no separating performance concerning separation of ions and the like, and imparts strength to the separation functional layer.

The thickness of the supporting membrane affects the strength of the separation membrane and the packing density of the separation membrane when the supporting membrane is incorporated into a membrane element. In order to obtain sufficient mechanical strength and packing density, the thickness of the supporting membrane is preferably in the range of 50-300 μm, more preferably in the range of 100-250 μm.

In this description, the term "thickness of a layer or membrane" means an average value unless otherwise indicated. The term "average value" herein means arithmetic average value.

(1-2-1) Porous Supporting Layer

It is preferable that the porous supporting layer in the present invention should include any of the following materials as a main component. As the material of the porous supporting layer, any one of or a mixture of two or more of homopolymers or copolymers of polysulfones, polyethersulfones, polyamides, polyesters, cellulosic polymers, vinyl polymers, polyphenylene sulfide, polyphenylene sulfide sulfones, polyphenylene sulfone, and polyphenylene oxide can be used.

For the cellulosic polymers, cellulose acetate, cellulose nitrate, and the like can be used. For the vinyl polymers, polyethylene, polypropylene, polyvinyl chloride, polyacrylonitrile, and the like can be used.

Among these, homopolymers or copolymers of polysulfones, polyamides, polyesters, cellulose acetate, cellulose nitrate, polyvinyl chloride, polyacrylonitrile, polyphenylene sulfide, polyphenylene sulfide sulfones, and polyphenylene sulfone are preferred.

More preferred examples include cellulose acetate, polysulfones, poly(phenylene sulfide sulfone)s, and poly(phenylene sulfone).

Of these materials, polysulfones can be especially advantageously used since this material is highly stable chemically, mechanically, and thermally and is easy to mold.

Specifically, a polysulfone made up of repeating units represented by the following chemical formula is preferred as a material serving as the main component of the porous supporting layer, because use of this polysulfone renders pore diameter control easy and this layer has high dimensional stability.

[Chem. 4]

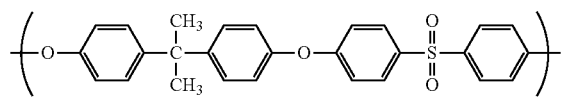

The polysulfone to be used in the present invention, when examined by gel permeation chromatography (GPC) using N-methylpyrrolidone as a developing solvent and using polystyrene as a reference, has a weight-average molecular weight (Mw) in the range of preferably 10,000-200,000, more preferably 15.000-100.000.

When the Mw thereof is 10,000 or higher, the polysulfone as a porous supporting layer can have preferred mechanical strength and heat resistance. Meanwhile, when the Mw thereof is 200,000 or less, the solution has a viscosity within an appropriate range and satisfactory formability is rendered possible.

In the porous supporting layer, the pore size gradually increases from the surface thereof on the side where a separation functional layer is to be formed to the other surface thereof, i.e., the surface facing the substrate.

The size of the fine pores in the surface on the side where a separation functional layer is to be formed is preferably 0.1-100 nm, more preferably 1-50 nm. When the size of the fine pores in the surface on the side where a separation functional layer is to be formed is 0.1 nm or larger, the porous supporting layer, in a composite membrane including this layer, is prevented from providing dominant permeation resistance. When the size thereof is 100 nm or less, this porous supporting layer is apt to serve as a scaffold for protuberances when a separation functional layer is formed thereon in a protuberant form, making it easy to evenly form a separation functional layer with protuberances.

The porous supporting layer is obtained, for example, by casting an N,N-dimethylformamide (hereinafter referred to as "DMF") solution of the polysulfone on a substrate in a certain thickness and coagulating the cast solution by a wet process in water. The supporting membrane obtained by this method can have a surface, most of which has fine pores having a diameter of 1-30 nm.

The thickness of the porous supporting layer affects the strength of the separation membrane to be obtained and the packing density of the separation membrane when the porous supporting layer is incorporated into a membrane element. In order to obtain sufficient mechanical strength and packing density, the thickness thereof is preferably in the range of 10-200 μm, more preferably in the range of 30-100 μm.

The morphology of the porous supporting layer can be examined with a scanning electron microscope, transmission electron microscope, or atomic force microscope. For example, in the case of an examination with a scanning electron microscope, the porous supporting layer is peeled from the substrate and then cut by the freeze fracturing method to obtain a sample for cross-section examination. This sample is thinly coated with platinum or platinum-palladium or ruthenium tetrachloride, preferably with ruthenium tetrachloride, and examined with a high-resolution field emission scanning electron microscope (UHR-FE-SEM) at an accelerating voltage of 3-15 kV. As the high-resolution field emission scanning electron microscope, for example, electron microscope Type S-900, manufactured by Hitachi Ltd. can be used.

(1-2-2) Substrate

Examples of the substrate for constituting the supporting membrane include polyester-based polymers, polyamide-based polymers, polyolefin-based polymers, and mixtures or copolymers thereof. Among these, polyester-based polymers are preferred, because supporting membranes which are highly excellent in terms of mechanical strength, heat resistance, water resistance, etc. are obtained therefrom.

Such polyester-based polymer to be used in the present invention is a polyester formed from an acid ingredient and an alcohol ingredient, and it is preferable that the polyester-based polymer is a main component of the substrate according to the present invention.

As the acid ingredient, for example, aromatic carboxylic acids such as terephthalic acid, isophthalic acid, and phthalic acid, aliphatic dicarboxylic acids such as adipic acid and sebacic acid, and alicyclic dicarboxylic acids such as cyclohexanedicarboxylic acid can be used.

As the alcohol ingredient, ethylene glycol, diethylene glycol, polyethylene glycol, and the like can be used.

Examples of the polyester-based polymers include polyethylene terephthalate resins, polybutylene terephthalate resins, polytrimethylene terephthalate resins, polyethylene naphthalate resins, polylactic acid resins, and polybutylene succinate resins. Examples thereof further include copolymers of these resins. From the standpoint of excellency in production cost, polyethylene terephthalate homopolymer or copolymers are particularly preferred.

The substrate in the present invention is in the form of fabric constituted of that polymer or the like. It is preferred to use a fibrous substrate as the fabric, from the standpoints of strength, ruggedness-forming ability, and fluid permeability.

As the substrate, either long-fiber nonwoven fabric or short-fiber nonwoven fabric can be advantageously used.

From the standpoints of formability and strength, it is preferable that in the long-fiber nonwoven fabric or short-fiber nonwoven fabric, fibers present in the surface layer on the opposite side to the porous supporting layer have been longitudinally oriented more than the fibers present in the surface layer on the side facing to the porous supporting layer. Longitudinal orientation will be described later. The long-fiber or short-fiber nonwoven fabric having such a structure is preferred because not only this nonwoven fabric is highly effective in preventing the separation membrane from suffering breakage or the like, but also the layered object including the porous supporting layer and this substrate shows improved formability when imparting ruggedness to the separation functional layer, enabling the surface of the separation functional layer to have a stable rugged shape.

More specifically, it is preferable that the degree of fiber orientation in that surface layer of the long-fiber nonwoven fabric or short-fiber nonwoven fabric which is on the opposite side to the porous supporting layer should be 0°-25°. It is also preferable that the orientation degree difference between the degree of fiber orientation in the surface layer on the opposite side to the porous supporting layer and the degree of fiber orientation in the surface layer on the side facing to the porous supporting layer should be 10°-90°.

Production of the separation membrane or separation membrane element includes a step for heating, a phenomenon occurs in which the porous supporting layer or the separation functional layer thermally shrinks. Especially in continuous membrane formation, shrinkage is severe in the width direction, along which no tension is imposed. Since the shrinkage causes problems concerning dimensional stability, etc., substrates having a low degree of thermal dimensional change are desirable. When, in the nonwoven fabric, the difference between the degree of fiber orientation in the surface layer on the opposite side to the porous supporting layer and the degree of fiber orientation in the surface layer on the side facing to the porous supporting layer is 10°-90°, thermal change along the width direction can be prevented and is hence preferred.

In this description, the "degree of fiber orientation" is an index which indicates the directions of the fibers of the nonwoven-fabric substrate for supporting the porous supporting layer. That term means an average angle of the fibers constituting the nonwoven-fabric substrate, when the direction of membrane formation in continuous membrane formation, i.e., the longitudinal direction of the nonwoven-fabric substrate, is taken as 0° and the direction perpendicular to the membrane formation direction, i.e., the width direction of the nonwoven-fabric substrate, is taken as 90°. Consequently, the closer the degree of fiber orientation to 0°, the more the fibers are longitudinally oriented, while the closer the degree of fiber orientation to 90°, the more the fibers are transversely oriented.

The degree of fiber orientation can be determined in the following manner.

Ten sample pieces are randomly taken out of the nonwoven fabric, and a surface of each sample is photographed with a scanning electron microscope at a magnification of 100-1,000 diameters. Ten fibers are selected for each sample in the photograph, and the hundred fibers in total are each examined for angle, with the longitudinal direction of the nonwoven fabric (machine direction, membrane formation direction) being taken as 0° and the width direction of the nonwoven fabric (transverse direction) being taken as 90°. An average value of the measured angles is rounded off to the nearest whole number to thereby determine the degree of fiber orientation.

From the standpoints of mechanical strength and packing density, the thickness of the substrate is preferably in the range of 30-200 μm, more preferably in the range of 50-120 μm.

The supporting membrane to be used in the present invention can be selected from among various commercial materials such as "Millipore Filter VSWP" (trade name), manufactured by Millipore Corp., and "Ultra Filter UK10" (trade name), manufactured by Toyo Roshi Ltd. Alternatively, the supporting membrane can be produced by the method described in *Office of Saline Water Research and Development Progress Report*, No. 359 (1968).

The thickness of the substrate or separation membrane can be measured with a digital thickness gauge. Meanwhile, since the thickness of the separation functional layer is far smaller than that of the porous supporting membrane, the thickness of the separation membrane can be regarded as the thickness of the porous supporting membrane. Consequently, the thickness of the porous supporting layer can be calculated in a simplified manner by measuring the thickness of the separation membrane with a digital thickness gauge and subtracting the thickness of the substrate from the thickness of the separation membrane. As the digital thickness gauge, for example, PEACOCK, manufactured by Ozaki MFG. Co., Ltd. can be used. In the case of using a digital thickness gauge, a thickness measurement is made on twenty portions, and an average value is calculated.

When it is difficult to measure the thickness of the substrate or the thickness of the separation membrane with a digital thickness gauge, the thickness thereof may be determined with a scanning electron microscope. On an electron photomicrograph of a cross-section, a thickness measurement is made on twenty points at intervals of 20 μm along a direction perpendicular to the thickness direction (along the plane direction of the layer or membrane, i.e., the horizontal direction). An average value of the measured thicknesses is calculated to determine the thickness.

(Permeation Flux of the Membrane)

It is preferable that the composite separation membrane of the present invention should have a permeation flux, as measured at 0.48 MPa and 25° C., of 2.0-4.5 $m^3/m^2$/day. The permeation flux of the membrane is more preferably 2.3-4.3 $m^3/m^2$/day, even more preferably 2.5-4.1 $m^3/m^2$/day. Conditions for measuring the permeation flux of membranes will be explained in detail in the Examples.

(Divalent/Monovalent Ion Selectivity for Removal)

In the present invention, the divalent/monovalent ion selectivity for removal is defined by (divalent ion removal ratio)/(monovalent ion removal ratio). It is preferable that the composite separation membrane of the present invention should have a divalent/monovalent ion selectivity for removal of 1.8 or higher. The divalent/monovalent ion selectivity for removal thereof is more preferably 2.0 or higher, even more preferably 2.2 or higher. Conditions for measuring the divalent/monovalent ion selectivity for removal will be explained in detail in the Examples. When the divalent/monovalent ion selectivity for removal thereof is 1.8 or higher, monovalent ions can be inhibited from stagnating on the raw-water side and the decrease in permeability due to concentration polarization can be inhibited. When the divalent/monovalent ion selectivity for removal is preferably 2.0 or higher, more preferably 2.2 or higher, the effect of inhibiting the decrease in permeability due to concentration polarization is enhanced.

2. Separation Membrane Element

Figure 3:
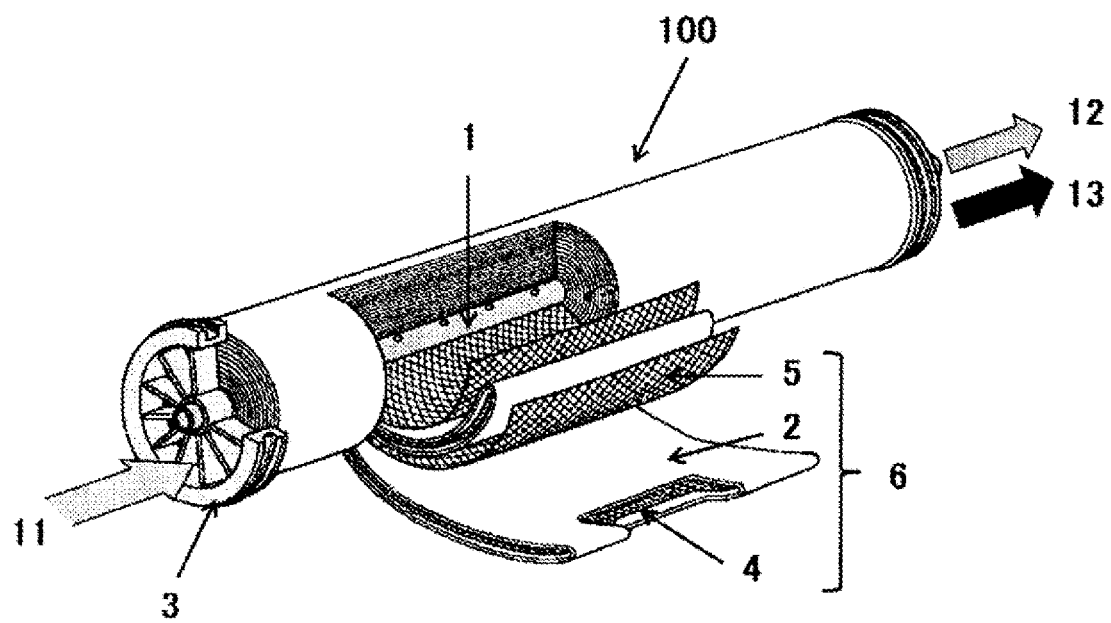
FIG. 3 is a partly developed slant view which schematically shows the configuration of members of a separation membrane element of the present invention.

As shown in FIG. 3, a separation membrane element 100 of the present invention is an element of the so-called spiral type which includes a collecting pipe 1, a separation membrane 2, end plates 3 (the end plates 3 are not essential), a permeation-side channel member 4, and a feed-side channel member 5, the separation membrane 2 having been wound around the collecting pipe 1.

The separation membrane 2, the feed-side channel member 5, and the permeation-side channel member 4 have been stacked and wound around the collecting pipe 1. The separation membrane 2 has been bonded into the shape of an envelope so that a portion of the permeation-side surface thereof faces another portion of the surface as will be described later.

The separation membrane element 100 has a cylindrical appearance. Raw water 11 is supplied through one end (left-hand end in FIG. 3) of the separation membrane element 100 to the inside of the separation membrane element 100. The raw water which has passed through the end plate 3 passes through the feed-side channel of the separation membrane 2 and is supplied to the feed-side surface of the separation membrane 2. Some of the raw water 11 penetrates the separation membrane 2, passes through the permeation-side channel, and flows as permeate 12 into the collecting pipe 1. The permeate 12 which has flowed through the collecting pipe 1 is taken out through the opposite-side end (right-hand end in FIG. 3) of the separation membrane element 100. The raw water 11 which has not penetrated the separation membrane 2 is discharged as a concentrate 13 through the right-hand end of the separation membrane element 100. The separation membrane element of the type described above includes one set or multiple sets of members (one or more leaves 6), each set including a separation membrane 2 formed into the shape of an envelope, with a permeation-side channel member 4 sandwiched between opposed portions of the separation membrane 2, and a feed-side channel member 5.

The separation membrane element 100 of the present invention satisfies the following: when saline water having a temperature of 25° C., a pH of 7, and an MgSO$_4$ concentration of 2.000 mg/L is used and filtrated therewith so as to result in a recovery ratio of 15%, at a feeding pressure (MPa) which satisfies the following expression (3) for relationship with effective membrane area (m$^2$), then the filtration results in a permeate flow rate of 1.0 L/min or higher and an MgSO$_4$ removal ratio of 90% or higher.

$$(\text{Effective membrane area (m}^2))\times(\text{feeding pressure (MPa)}) \leq 0.3 \quad (3)$$

It is preferable that the separation membrane element 100 should have an effective membrane area of 0.3-3.0 m$^2$, an outer diameter of 1.5-3.5 inches, and a length of 10-15 inches. When the separation membrane element 100 has such size, purified water can be obtained at a rate of 1.0 L/min or higher with the tap water feeding pressure (usually 0.1-0.3 MPa) only, without providing a booster pump. When the purified-water production rate is less than 1.0 L/min, the purified-water feed amount is insufficient and it is necessary to provide a water receiver tank or a booster pump or to increase the effective membrane area by enlarging the separation membrane element 100.

The effective membrane area can be determined by disassembling the separation membrane element 100, which is configured of a separation membrane 2 wound around a collecting pipe 1, end plates 3, a permeation-side channel member 4, and a feed-side channel member 5, and summing up the areas of the nonbonded portions of the separation membrane 2, which has been formed into the shape of an envelope, with the permeation-side channel member 4 sandwiched between the opposed portions.

(2-1) Permeation-Side Channel Member

As the permeation-side channel member 4 for use in the separation membrane element 100, not only conventional tricot fabric but also weft knitted fabric formed thickly so as to provide wider channels than the tricot fabric, weft knitted fabric having a reduced fiber basis weight, a sheet obtained by disposing projections on a porous sheet such as nonwoven fabric, or a rugged sheet obtained by giving ruggedness-imparting processing to a film or nonwoven fabric may be used. More preferred is weft knitted fabric formed thickly so as to provide wider channels than the tricot fabric, weft knitted fabric having a reduced fiber basis weight, a sheet obtained by disposing projections on a porous sheet such as nonwoven fabric, or a rugged sheet obtained by giving ruggedness-imparting processing to a film or nonwoven fabric.

When the permeation-side channel member has such a configuration, the permeation-side flow resistance can be reduced and a high rate of water production by the element can be obtained. In particular, in a high-recovery operation, the flow rate of feed water increases and the concentration polarization can be diminished, and thus decrease in the water production rate can be prevented.

General separation membrane elements are operated at a recovery ratio of 30% or less, while the separation membrane element of the present invention can stably work even at a recovery ratio of 35% or higher. The higher the recovery ratio, the more advantageous over the conventional separation membrane elements.

<Thickness of the Permeation-Side Channel Member>

Figure 4:
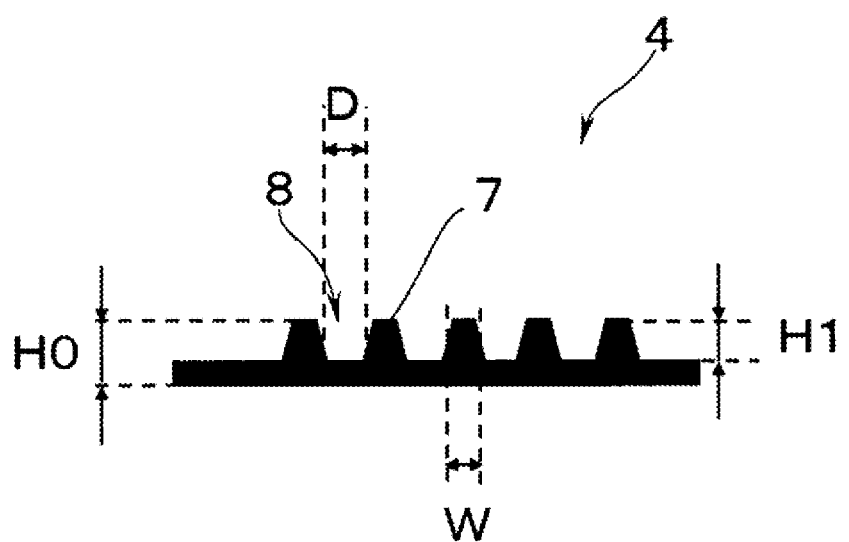
FIG. 4 is a cross-sectional view for illustrating the shape of a permeation-side channel member applicable to the present invention.

The thickness H0 of the permeation-side channel member in FIG. 4 is preferably 0.1-1 mm. Although film thickness measuring devices of various types including the electromagnetic type, ultrasonic type, magnetic type, and light transmission type are commercially available, a film thickness measuring device of any non-contact type may be used for measuring the thickness. A measurement is made on randomly selected ten portions, and the thickness is evaluated in terms of an average value thereof. When the thickness H0 of the permeation-side channel member is 0.1 mm or larger, this permeation-side channel member has the required strength and can be handled without collapsing or breaking even when stress is imposed thereon. Meanwhile, when the thickness H0 of the permeation-side channel member is 1 mm or less, the number of separation membranes and channel members which can be inserted into a separation membrane element can be increased without impairing the windability around the collecting pipe.

In the case of a permeation-side channel member which is adherent to the permeation-side surface of the separation membrane, the thickness H0 of this permeation-side channel member is the same as the height H1 of protrusions of the permeation-side channel member, the height H1 being described below.

<Height of Protrusions of the Permeation-Side Channel Member, and Groove Width>

The height H1 of protrusions of the permeation-side channel member in FIG. 4 is preferably 0.05-0.8 mm, and the groove width D is preferably 0.02-0.8 mm. The height H1 of the protrusions and the groove width D can be measured through an examination of a cross-section of the permeation-side channel member with a commercially available microscope or the like.

The spaces formed by the protrusions having a height H1 and a groove width D, and by the stacked separation membrane can serve as channels and when the height H1 of the protrusions and the groove width D are in those ranges, then the flow resistance can be reduced while inhibiting membrane sinking during pressure filtration and a separation membrane element excellent in pressure resistance and water production performance can be obtained.

<Width of Protrusions of the Permeation-Side Channel Member>

The width W of the protrusions 7 of the permeation-side channel member in FIG. 4 is preferably 0.1 mm or larger, more preferably 0.3 mm or larger. When the width W is 0.1 mm or larger, the protrusions can retain the shape thereof and permeation-side channels are stably formed, even when pressure is applied to the permeation-side channel member during operation of the separation membrane element. The width W is preferably 1 mm or less, more preferably 0.7 mm or less. When the width W is 1 mm or less, channels can be sufficiently ensured on the permeation side of the separation membrane.

The width W of protrusions 7 is measured in the following manner. First, with respect to one of the protrusions 7 in the cross-section shown in FIG. 4, an average of the maximum width and minimum width thereof is calculated. Namely, in the case of a protrusion 7 in which the top is thin and the bottom is thick, such as those shown in FIG. 4, the width of the bottom of the protrusion and the width of the top thereof are measured and an average thereof is calculated. Such averages are calculated with respect to at least thirty cross-sections, and an arithmetic average thereof is calculated. Thus, the width W for the one membrane can be calculated.

<Material of the Permeation-Side Channel Member>

With respect to the form of the sheet-shaped object, knit fabric, woven fabric, porous film, nonwoven fabric, net, or the like can be used. Nonwoven fabric is especially preferred because the fibers constituting the nonwoven fabric form wider spaces thereamong which serve as channels to enable the water to flow easily, resulting in an improvement in the water production performance of the separation membrane element.

With respect to the material of the polymer to be used as a material for constituting the permeation-side channel member, any polymeric material may be used without particular limitations so long as the polymeric material is capable of retaining the shape of the permeation-side channel member without elution of components in the permeate. Examples thereof include synthetic resins such as polyamide resins, e.g., nylons, polyester resins, polyacrylonitrile resins, polyolefin resins, e.g., polyethylene and polypropylene, polyvinyl chloride resins, polyvinylidene chloride resins, and polyfluoroethylene resins. It is preferred to use a polyolefin resin or a polyester resin considering the strength to withstand higher pressures and hydrophilicity.

In the case where the sheet-shaped object is configured of a plurality of fibers, the fibers may include, for example, ones which have a polypropylene/polyethylene core-sheath structure.

<Channels Formed by the Permeation-Side Channel Member>

In the case where a separation membrane has been disposed on both surfaces of a permeation-side channel member, the spaces between the adjacent protrusions can be channels for permeate. The channels may be ones formed by a permeation-side channel member itself which has been formed into the shape of a corrugated sheet, rectangular waves, triangular waves, or the like, or by a permeation-side channel member in which one surface is flat and the other surface has been rugged, or by a permeation-side channel member and another member superposed on a surface of the channel member so as to form a rugged shape.

<Shape of the Permeation-Side Channel Member>

Figure 5:
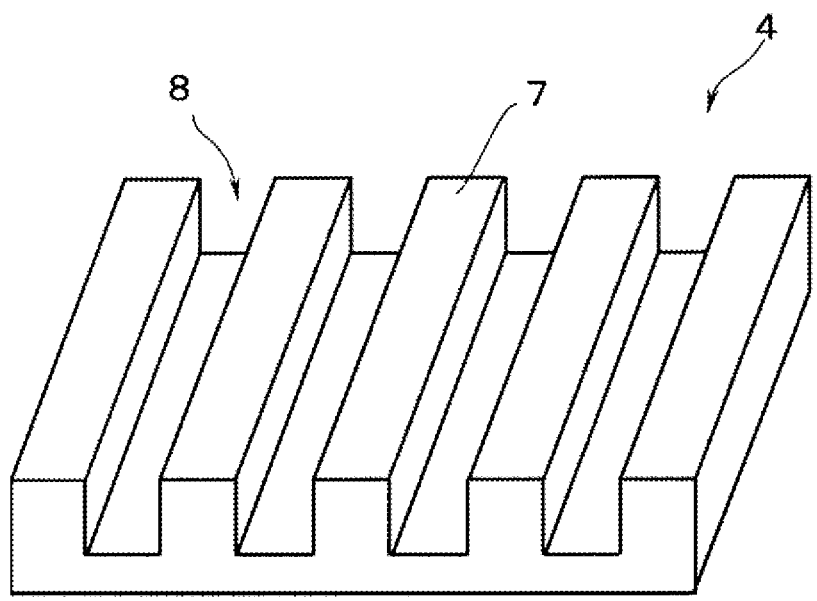
FIG. 5 shows another example of permeation-side channel members applicable to present invention.

It is preferable that the permeation-side channel member according to the present invention should have a rugged shape which has continuous grooves arranged in parallel along one direction, as shown in FIG. 5. However, the protrusions for forming channels may be in the shape of dots. With respect to the arrangement of dots, zigzag arrangement is advantageous for inhibiting sinking because the stress to be imposed during reception of feed water is dispersed. The cross-sectional shape of each dot is not particularly limited, and may be a polygonal shape, elliptic shape, etc. Protrusions having different cross-sectional shapes may coexist.

The protrusions may each be one having a shape which changes in the width of cross-sectional shape along the direction perpendicular to the winding direction, such as a trapezoidal wall, elliptic cylinder, elliptic cone, rectangular pyramid, or hemisphere.

3. Production Process

A process for producing the separation membrane of the present invention is explained next. The production process includes a step for forming a porous supporting membrane, a step for forming a separation functional layer, and a step for post-treatment of the separation functional layer.

(3-1) Step for Forming Porous Supporting Membrane

The step for forming a porous supporting membrane includes a step in which a polymer solution is applied to a substrate and a step in which the substrate coated with the solution is immersed in a coagulating bath to coagulate the polymer.

In the step of applying a polymer solution to a substrate, the polymer solution is prepared by dissolving a polymer serving as a component of the porous supporting layer in a good solvent for the polymer.

When a polysulfone is used as the polymer, the temperature of the polymer solution during application thereof is preferably in the range of 10-60° C. When the temperature of the polymer solution is within that range, the polymer is solidified after the polymer solution has sufficiently infiltrated into the interstices among fibers of the substrate, without causing polymer precipitation. As a result, the porous supporting layer is tenaciously bonded to the substrate by the anchoring effect, and a satisfactory porous supporting membrane can be obtained. A preferred range of the temperature of the polymer solution can be suitably adjusted in accordance with the kind of the polymer used, the desired solution viscosity, etc.

It is preferable that the time period from the application of the polymer solution to the substrate to the immersion in a coagulating bath should be in the range of 0.1-5 seconds. When the time period to the immersion in a coagulating bath is within that range, the polymer is solidified after the polymer-containing organic-solvent solution has sufficiently infiltrated into the interstices among fibers of the substrate. A preferred range of the time period to the immersion in a coagulating bath can be suitably adjusted in accordance with the kind of the polymer solution used, the desired solution viscosity, etc.

Water is usually used as the coagulating bath. However, any coagulating bath into which the polymer serving as a component of the porous supporting layer does not elute may be used. Depending on the composition of the coagulating bath, the porous supporting membrane to be obtained varies in membrane morphology and the separation membrane to be obtained varies accordingly. The temperature of the coagulating bath is preferably −20° C. to 100° C., more preferably 10-50° C. When the temperature of the coagulating bath is not higher than the upper limit, the coagulating bath can be inhibited from suffering surface vibrations due to thermal movement, and the membrane thus formed can retain surface smoothness. Meanwhile, when the temperature of the coagulating bath is not below the lower limit, a coagulation rate can be maintained and, hence, an improvement in membrane formation efficiency can be attained.

The porous supporting membrane thus obtained may be subsequently washed with hot water in order to remove the solvent remaining in the membrane. The temperature of the hot water in this washing is preferably 40-100° C., more preferably 60-95° C. When the washing temperature is not higher than the upper limit, the porous supporting membrane is prevented from shrinking excessively and decrease in permeability can be prevented. Meanwhile, when the washing temperature is not below the lower limit, a high washing effect is obtained.

(3-2) Step for Forming Separation Functional Layer

Next, the step for forming a separation functional layer is explained. In this step, an aqueous solution containing a polyfunctional aliphatic amine and a solution containing a polyfunctional acid halide are used to conduct interfacial polycondensation on a surface of the porous supporting membrane to thereby form a separation functional layer. The solution containing a polyfunctional acid halide is a solution obtained by dissolving the polyfunctional acid halide in an organic solvent. With respect to a technique essential for forming a separation functional layer with protuberances to obtain a membrane which has both divalent-ion removability and permeability, it is important, as stated hereinabove, to optimize the distribution and diffusion of a polyfunctional aliphatic amine in the organic solvent during the interfacial polycondensation. It is necessary that the porous supporting membrane containing a polyfunctional aliphatic amine should be brought into contact at 40-70° C. with an organic-solvent solution containing a polyfunctional acid halide and that the subsequent interfacial polycondensation should be conducted at −5° C. to 25° C. By practicing this technique, a separation functional layer with protuberances can be formed and a membrane having both divalent-ion removability and permeability can be obtained. Furthermore, by adjusting the pH of the aqueous solution containing a polyfunctional aliphatic amine to, for example, 8.5-11.0, the membrane performances are further improved.

Details of these techniques are explained below in order.

As the organic solvent for dissolving a polyfunctional acid halide therein, use is made of an organic solvent which is immiscible with water and neither damages the porous supporting membrane nor inhibits the reaction for yielding a crosslinked polyamide and which has a solubility parameter (SP value) of 15.2 $(MPa)^{1/2}$ or higher and a log P of 3.2 or larger. When the SP value thereof is 15.2 $(MPa)^{1/2}$ or higher and the log P thereof is 3.2 or larger, the distribution and diffusion of the polyfunctional aliphatic amine during the interfacial polycondensation is optimized and a separation functional layer is apt to be formed so as to have protuberances. Representative examples thereof include octane, nonane, decane, undecane, dodecane, tridecane, tetradecane, heptadecane, hexadecane, cyclooctane, ethylcyclohexane, 1-octene, 1-decene, and the like. It is preferred to use one of these or a mixture of two or more thereof.

The aqueous solution containing a polyfunctional aliphatic amine may contain a surfactant. Examples thereof include sodium dodecylbenzenesulfonate, sodium dodecyl sulfate, sodium dodecyl diphenyl ether disulfonate, and styrenebis(sodium naphthalenesulfonate). When a surfactant is contained, the rate of diffusion of the polyfunctional amine in the organic solvent phase increases and the separation functional layer is more apt to be formed so as to have protuberances.

The pH of the aqueous solution containing a polyfunctional amine is preferably 8.5-11.0, more preferably 9.0-10.0. In order to attain such pH, an acid compound may be added if necessary. Examples thereof include hydrochloric acid and sulfuric acid. By adjusting the pH of the aqueous solution containing a polyfunctional amine to 11.0 or less, the hydrogen halide molecules yielded by the interfacial polycondensation reaction are rendered less apt to be removed and the reactivity of the polyfunctional amine can be reduced, thereby enabling the polyfunctional amine to diffuse to a longer distance in the organic solvent until the reaction with the polyfunctional acid halide is completed. Thus, a separation functional layer with protuberances can be formed. By adjusting the pH of the aqueous solution containing a polyfunctional amine to 9.0 or higher, decrease in the reactivity of the polyfunctional amine can be inhibited and decrease in the divalent ion/monovalent ion selectivity for removal can be inhibited.

The aqueous solution containing a polyfunctional aliphatic amine and the organic-solvent solution containing a polyfunctional acid halide each may contain compounds such as an acylation catalyst, polar solvent, acid scavenger, and antioxidant, if necessary.

In order to perform the interfacial polycondensation on a surface of the porous supporting membrane, the surface of the porous supporting membrane is first covered with the aqueous solution containing a polyfunctional aliphatic amine. For covering the surface of the porous supporting membrane with the aqueous solution containing a polyfunctional aliphatic amine, any known application means may be used so long as the surface of the porous supporting membrane is uniformly and continuously covered with the aqueous solution. For example, known methods, such as a method in which the aqueous solution is applied to the surface of the porous supporting membrane or a method in which the porous supporting membrane is immersed in the aqueous solution may be used. The time period during which the porous supporting membrane is in contact with the aqueous solution containing a polyfunctional aliphatic amine is preferably in the range of 5 seconds to 10 minutes, more preferably in the range of 10 seconds to 2 minutes.

In the method in which the porous supporting membrane is immersed in the aqueous solution containing a polyfunctional aliphatic amine, the concentration of the polyfunctional aliphatic amine in the aqueous solution is preferably 0.5-5.0% by weight, more preferably 1.0-4.0% by weight. When the concentration of the polyfunctional aliphatic amine is 0.5% by weight or higher, the amine can diffuse in the organic solvent phase in an amount sufficient for forming a separation functional layer having protuberances. When the concentration of the polyfunctional aliphatic amine is 5.0% by weight or less, the polycondensation reaction within the protuberances is prevented and the separation functional layer thus formed has a hollow protuberant structure.

It is preferable that the excessively applied aqueous solution should subsequently be removed in an excess-solution removal step. Examples of methods for the excess-solution removal include a method in which the membrane is held vertically to make the excess solution flow down naturally. After the excess-solution removal, the membrane surface may be dried to remove all or some of the water contained in the aqueous solution.

Thereafter, the porous supporting membrane covered with the aqueous solution containing a polyfunctional aliphatic amine is brought into contact with an organic-solvent solution containing the polyfunctional acid halide described above, and a separation functional layer of a crosslinked polyamide is formed by subsequent interfacial polycondensation.

For obtaining a separation membrane of the present invention, it is necessary that the temperature at which the porous supporting membrane containing the polyfunctional aliphatic amine is brought into contact with the polyfunctional acid halide should be in the range of 40-70° C. and that the subsequent interfacial polycondensation should be conducted at a temperature in the range of −5° C. to 25° C.

The temperature during the contact is more preferably in the range of 40-60° C. When the temperature during the contact is below 40° C., the rate of amine diffusion in the organic solvent is not sufficiently high. Meanwhile, when the temperature during the contact exceeds 70° C., the diffusion is inhibited due to an increase in reaction rate and the protuberant structure is hence prevented from enlarging, resulting in a problem of reduced permeation flux. Examples of means for regulating the temperature during the contact include: a method in which the porous supporting membrane is immersed in a heated aqueous solution containing a polyfunctional aliphatic amine; a method in which the porous supporting membrane containing an aqueous solution of a polyfunctional aliphatic amine is heated; and a method in which a heated organic-solvent solution of a polyfunctional acid halide is contacted. Examples of methods for heating the supporting membrane include heating with a hot-air oven and infrared ray irradiation. The temperature during the interfacial polycondensation can be determined, for example, through a measurement with a non-contact thermometer such as a radiation thermometer or through a measurement with a thermocouple thermometer in contact with the membrane surface.

The temperature during the interfacial polycondensation is more preferably in the range of 0-20° C. When the temperature during the interfacial polycondensation is below −5° C., the rate of amine diffusion in the organic solvent is not sufficiently high. Meanwhile, when the temperature during the interfacial polycondensation exceeds 25° C., the diffusion is inhibited due to an increase in reaction rate and the protuberant structure is hence prevented from enlarging, resulting in a problem of reduced permeation flux.

The time period of the contact step is preferably 0.1-10 seconds, more preferably 0.5-5 seconds. The time period during which the interfacial polycondensation is performed is preferably 0.1 second to 1 minute, more preferably 0.1-30 seconds.

The concentration of the polyfunctional acid halide in the organic-solvent solution thereof is adjusted so that the ratio of the weight fraction thereof to the weight fraction of the aqueous solution of a polyfunctional aliphatic amine is preferably 0.01-0.2, more preferably 0.025-0.1. When the ratio thereof is within that range, the polyfunctional acid halide is supplied during the interfacial polymerization reaction in an amount which is optimal for forming a separation functional layer with protuberances, relative to the amount of the polyfunctional aliphatic amine that has been distributed and diffused in the organic phase. As a result, a polyamide is formed in which the presence ratio (molar ratio) between the amino groups and amide groups that are derived from the polyfunctional aliphatic amine and the carboxy groups and amide groups that are derived from the polyfunctional acid halide is 0.8-1.2.

(3-3) Step for Post-Treatment of the Separation Functional Layer

The separation functional layer formed by the interfacial polycondensation is washed with hot water. The separation functional layer is washed at a temperature in the range of 25-90° C. for 1-60 minutes, thereby removing the unreacted starting materials and low-molecular-weight oligomers yielded by the interfacial polycondensation. Thus, the effect of improving the property of selectively separating monovalent/divalent ions can be obtained.

4. Process for Producing the Separation Membrane Element

Although processes usable for producing the separation membrane element 100 are not limited to the following production process, a representative process for producing a spiral type element is described below. In the process, a separation functional layer is superposed on a porous supporting layer and a substrate to obtain a separation membrane 2 and this separation membrane 2 is then wound around a collecting pipe 1 together with a permeation-side channel member 4 and a feed-side channel member 5.

As processes for producing the separation membrane element, the processes described in reference documents (JP-B-44-14216, JP-B-4-11928, and JP-A-11-226366) can be used. Details thereof are as follows.

When winding the separation membrane 2 around a collecting pipe 1, the composite separation membrane is disposed so that a closed end of the leaf 6, i.e., a closed-opening part of the envelope-shaped membrane, faces the collecting pipe. The separation membrane 2 thus disposed is wound around the collecting pipe 1, thereby spirally winding the separation membrane 2.

A spacer, such as tricot fabric or a substrate, may be wound beforehand around the collecting pipe 1. This winding not only renders an adhesive applied to the collecting pipe 1 less apt to flow during the winding of the separation membrane, leading to leakage inhibition, but also stably secures channels around the collecting pipe. The spacer may be wound over any length which is not less than the circumference of the collecting pipe 1.

The process for producing the separation membrane element 100 may include a step in which a film and/or a filament or the like is further wound on the periphery of the thus-formed spiral of the separation membrane 2. When the operating pressure of the fluid separator which will be described later exceeds 2 MPa, it is preferred to wind a filament around the spiral to enhance the strength thereof in order to prevent the spiral from being damaged. Furthermore, the process for producing the separation membrane element 100 may include other steps, such as edge cutting for truing up the edge of the separation membrane 2 at each end along the longitudinal direction of the collecting pipe and attachment of end plates 3.

5. Utilization of the Separation Membrane and Separation Membrane Element

The separation membrane of the present invention can be used for selective separation of solutes, for example, when converting hard water containing both monovalent ions (sodium ions, etc.) and divalent ions (calcium ions, magnesium ions, etc.) into soft water or when separating monosaccharides from polysaccharides.

Separation membrane elements 100 produced in the manner described above can be connected serially or in parallel and disposed in a pressure vessel, thereby producing a separation membrane module.

Furthermore, the separation membrane or the element or module thereof can be combined with a pump for supplying raw water thereto, a device for pretreating the raw water, etc., thereby configuring a fluid separator. By using this separator, raw water can be separated into a permeate such as potable water and a concentrate which has not passed through the membrane. Thus, water suited for a purpose can be obtained.

For example, the element or module is directly connected to a service water tap or is suitably combined with a pretreatment device for pretreating the fluid, a post-treatment device for a post-treatment thereto, etc. Thus, a water purifier can be configured. By using this water purifier, tap water can be separated into a permeate and a concentrate which has not passed through the membrane, and purified water suited for a purpose can be obtained in a sufficient amount without necessitating a booster pump. However, a booster pump may be disposed, if necessary.

Figure 6:
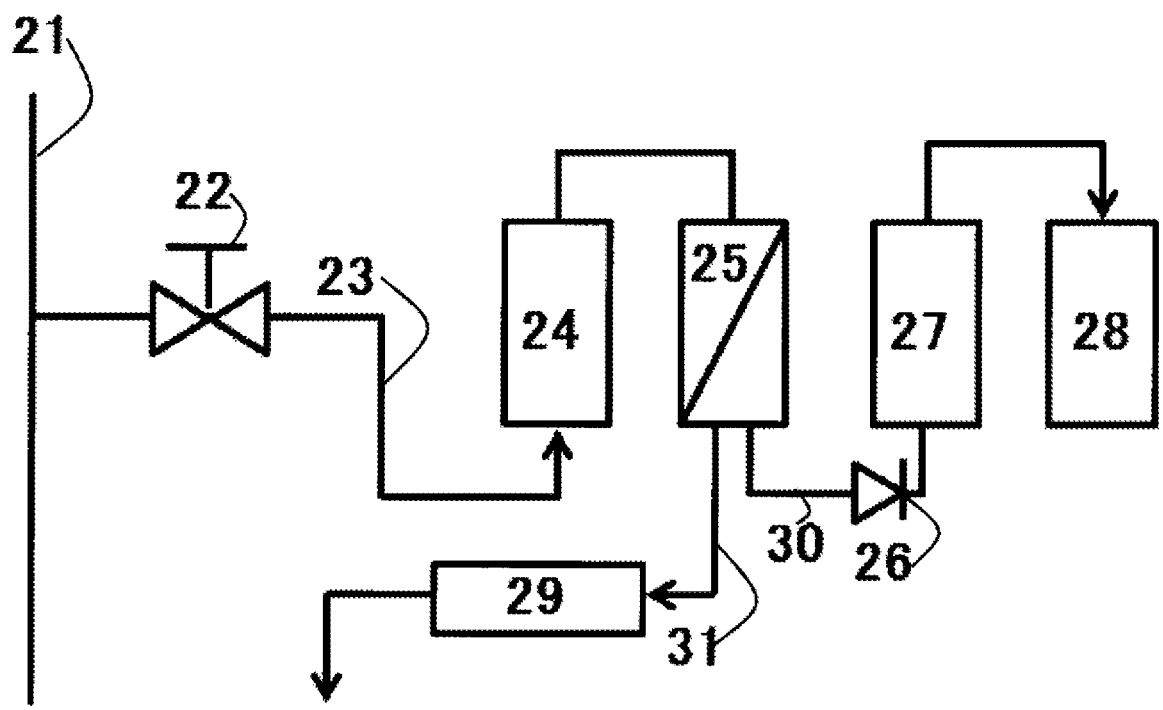
FIG. 6 is a diagrammatic flowchart showing a domestic water purifier system employing the separation membrane element of the present invention.

An example of the water purifier in which the element is used in combination with a pretreatment device and a post-treatment device is shown in FIG. 6. The water purifier has a structure which is configured of a service water pipeline 21, a feed valve 22, a water supply pipeline 23, a pretreatment filtration filter 24, a main-filtration-part filter 25 constituted of a separation membrane element 100 of the present invention, a check valve 26, a post-treatment filtration filter 27, a purified-water feed valve 28, and a purified-water pipeline 30, and in which the concentrate obtained in the main-filtration-part filter 25 during the water purification is discharged through a concentrate pipeline 31 with a flow control valve 29. The structure of the water purifier is not limited to the structure described above.

As the pretreatment filtration filter 24, any one of or a combination of two or more of micro-precipitate filters made of a metal or plastic and carbon filters such as a granular-activated-carbon filter, a powdery-activated-carbon filter, and a rod-activated-carbon filter can be used. As the post-treatment filtration filter 27, any one of or a combination of two or more of an ultraviolet disinfector, an activated-carbon filter, a ceramic filter, an activated-carbon filter containing a silver ingredient, an ultrafiltration membrane filter, a magnetized filter, and the like can be used. The water purified by the main-filtration-part filter 25 passes through the check valve 26 and flows into the post-treatment filtration filter 27, where final purification is conducted. The water finally purified is directly supplied as purified water through the purified-water feed valve 28, without being stored in a water receiver tank.

In this embodiment, the tap-water feeding pressure is utilized as a filtration pressure for the separation membrane element. In this embodiment, the members (22, 23, 24) disposed between the service water pipeline 21 and the separation membrane element, which is the main-filtration-part filter 25, function as a water supply part which supplies tap water to the separation membrane element without pressurizing the tap water. In another embodiment, however, the water purifier may include a pressurizing part, e.g., a pump, which can give a filtration pressure to the separation membrane element.

According to the separation membrane element of this embodiment, the water purifier is not equipped with a tank for storing the permeate therein, because a sufficiently high water production rate can be attained. In another embodiment, however, the water purifier may be equipped with a tank for storing the permeate therein.

EXAMPLES

The present invention is explained below in more detail by reference to Examples, but the present invention should not be construed as being limited by the following Examples in any way.

<Property Evaluation of Separation Membrane and Separation Membrane Element>

(Magnesium Sulfate Removal Ratio)

Evaluation water adjusted so as to have a temperature of 25° C., pH of 7.0, and magnesium sulfate concentration of 2.000 mg/L was supplied to a separation membrane at an operating pressure of 0.48 MPa to conduct a membrane filtration treatment for 1 hour. Thereafter, the feed water and the permeate were examined for electrical conductivity with a conductivity meter manufactured by Toa Electronics Ltd., to obtain the practical salinities, i.e., magnesium sulfate concentrations thereof. The magnesium sulfate removal ratio was calculated on the basis of the magnesium sulfate concentrations thus obtained and the following equation.

Magnesium sulfate removal ratio (%)={1−(magnesium sulfate concentration in permeate)/(magnesium sulfate concentration in feed water)}×100

(Sodium Chloride Removal Ratio)

Evaluation water adjusted so as to have a temperature of 25° C., pH of 7.0, and sodium chloride concentration of 500 mg/L was supplied to a separation membrane at an operating pressure of 0.48 MPa to conduct a membrane filtration treatment for 1 hour. The feed water and the permeate were examined for electrical conductivity with a conductivity meter manufactured by Toa Electronics Ltd., to obtain the practical salinities, i.e., sodium chloride concentrations thereof. The sodium chloride removal ratio was calculated on the basis of the sodium chloride concentrations thus obtained and the following equation.

Sodium chloride removal ratio (%)={1−(sodium chloride concentration in permeate)/(sodium chloride concentration in feed water)}×100

(Divalent/Monovalent Ion Selectivity for Removal)

From the magnesium sulfate removal ratio and sodium chloride removal ratio obtained through the tests described in sections given above, the divalent/monovalent ion selectivity for removal was determined using the following equation.

Divalent/monovalent ion selectivity for removal= (magnesium sulfate removal ratio)/(sodium chloride removal ratio)

(Membrane Permeation Flux)

The membrane permeation rate of feed water (aqueous solution of magnesium sulfate) was measured in the test described in a preceding section and was converted to permeate flow rate ($m^3$) per $m^2$ of the membrane area per day, which was taken as membrane permeation flux ($m^3/m^2$/day).

(Rate of Water Production by Element)

In the test described in a preceding section, the rate of water production from feed water (aqueous solution of magnesium sulfate) by the element was measured at a given recovery ratio. The amount of the permeate (L) per element per minute was expressed in terms of water production rate (L/min).

(Recovery Ratio)

The ratio between the amount of the feed water $V_F$ supplied in a given time period in the measurement of water production rate and the amount of permeate $V_P$ obtained in the same time period was taken as the recovery ratio and calculated using $V_P/V_F \times 100$.

<Evaluation of Membrane Structure>

(Presence Ratio between Amino and Amide Groups derived from Polyfunctional Aliphatic Amine and Carboxy and Amide Groups derived from Polyfunctional Acid Halide, as Components of the Separation Functional Layer)

The substrate was peeled from a separation membrane to obtain a layered object composed of the porous supporting layer and the separation functional layer. Thereafter, the porous supporting layer was dissolved away in dichloromethane to thereby obtain the separation functional layer. The separation functional layer thus obtained was hydrolyzed by heating in a heavy-water solution of a strong alkali, and the heavy-water solution used for the hydrolysis was filtrated and examined by $^1$H-NMR spectroscopy. The data obtained by the examination were analyzed, and the presence ratio between amino groups derived from the polyfunctional aliphatic amine and carboxy groups derived from the polyfunctional acid halide was calculated from the values of peak areas (Presence ratio by NMR in Table 2).

(Relative Surface Area)

The relative surface area of a separation functional layer is the ratio of the surface area of the separation functional layer to the surface area of the porous supporting membrane. A separation membrane sample was embedded in an epoxy resin and dyed with $OsO_4$ in order to facilitate a cross-section examination. This sample was cut with an ultramicrotome to produce ten ultrathin sections. For the ultrathin sections thus obtained, cross-sectional photographs were taken using a transmission electron microscope. The accelerating voltage during the examination was 100 kV, and the magnification was 10.000 diameters. The ten cross-sectional photographs obtained were analyzed with image analysis software Image J to calculate the length of the separation functional layer and the length of the porous supporting layer. Thereafter, the average relative surface area of the separation functional layer was determined using the following equation.

Relative surface area of separation functional layer=
(length of separation functional layer)²/(length
of porous supporting layer)²

(Presence or Absence of Hollow Protuberant Structure)

In the cross-sectional photographs taken with a transmission electron microscope in the determination of relative surface area, the "protuberance height of the separation functional layer" and the "thin-membrane thickness of the separation functional layer" were measured. The value of "protuberance height of the separation functional layer"/ "thin-membrane thickness of the separation functional layer" was calculated. When the value of "protuberance height of the separation functional layer"/"thin-membrane thickness of the separation functional layer" was larger than 1.1, the separation functional layer was regarded as having a hollow protuberant structure. When the value thereof was 1.1 or less, the separation functional layer was regarded as not having a hollow protuberant structure.

The "thin-membrane thickness of the separation functional layer" is the length of a line segment which, in the image of a cross-section of the separation functional layer, connects a point on the feed-water-side surface of the separation functional layer to the nearest point on the permeate-side surface thereof, and corresponds to the length indicated by the "thin-membrane thickness" in FIG. 2. The cross-sectional image of the separation functional layer is divided into ten sections and the point on the feed-water-side surface which is most apart from the supporting membrane in each section is taken as the measuring point on the feed-water-side surface. When the separation functional layer has a protuberant structure and the protuberant structure has been formed so as to lie over sections, then the section where the feed-water-side surface has a larger distance from the supporting membrane is used for the measuring point. Meanwhile, the "protuberance height of the separation functional layer" is as follows. A line perpendicular to the surface of the supporting membrane is drawn from the feed-water-side point used for measuring the thickness of the separation functional layer, and the length of the line segment which connects that point to the intersection of the perpendicular and the supporting-membrane surface is taken as the "protuberance height of the separation functional layer". This length corresponds to the length indicated by the "protuberance height" in FIG. 2.

(Zeta-Potential)

A separation membrane was washed with ultrapure water, set in a cell for flat-sheet samples so that the surface of the separation functional layer of the separation membrane came into contact with a monitor particle solution, and examined with an electrophoretic light scattering photometer (ELS-8000) manufactured by Otsuka Electronics Co., Ltd. As the monitor particle solution, examination liquids obtained by dispersing polystyrene-latex monitor particles in 10-mM aqueous NaCl solutions respectively having pH values adjusted to 4 and 9 were used.

Production of Separation Membranes

Example 1

A 15% by weight dimethylformamide (DMF) solution of a polysulfone was cast on nonwoven fabric (air permeability, 1.0 cc/cm²/sec) composed of polyester fibers and produced by a wet-laid paper method, at room temperature (25° C.) in an application thickness of 180 µm. Immediately thereafter, the coated nonwoven fabric was immersed in pure water for 5 minutes, to form a porous supporting layer on the substrate. Thus, a porous supporting membrane was produced.

Next, the porous supporting membrane was immersed for 10 seconds in an aqueous solution containing, dissolved therein, 2.0% by weight 2-ethylpiperazine, 100 ppm sodium (dodecyl diphenyl ether)disulfonate, and 1.0% by weight trisodium phosphate, and nitrogen was thereafter blown against the porous supporting membrane from an air nozzle to remove the excess aqueous solution. The aqueous amine solution used above had a pH of 12.0. Subsequently, an n-decane solution containing 0.2% by weight trimesoyl chloride and heated to 70° C. was evenly applied to the surface of the porous supporting layer, and this coated membrane was held for 3 seconds at a membrane surface temperature of 60° C., subsequently cooled to a membrane surface temperature of 10° C., and allowed to stand for 1 minute in an air atmosphere while maintaining that temperature, to form a separation functional layer. Thereafter, the membrane was vertically held to remove the excess solution. The membrane thus obtained was washed with 60° C. pure water for 2 minutes. The membrane performances and membrane structure of the separation membrane thus obtained are shown in Table 2.

Examples 2 to 5

Separation membranes were produced in the same manner as in Example 1, except that the membrane surface temperature during the contact between the amine and trimesoyl chloride and the membrane surface temperature during the interfacial polymerization were changed as shown in Table 1. The membrane performances and membrane structure of each separation membrane obtained are shown in Table 2.

Example 6

A separation membrane was produced in the same manner as in Example 1, except that the aqueous solution of 2-ethylpiperazine was replaced with an aqueous solution of 2,5-dimethylpiperazine. The membrane performances and membrane structure of the separation membrane obtained are shown in Table 2.

Example 7

A separation membrane was produced in the same manner as in Example 1, except that the aqueous solution of 2-ethylpiperazine was replaced with an aqueous solution of 2-methylpiperazine. The membrane performances and membrane structure of the separation membrane obtained are shown in Table 2.

Example 8

A separation membrane was produced in the same manner as in Example 1, except that the aqueous solution of 2-ethylpiperazine was replaced with an aqueous solution of 2,5-diethylpiperazine. The membrane performances and membrane structure of the separation membrane obtained are shown in Table 2.

Example 9

A separation membrane was produced in the same manner as in Example 1, except that the aqueous solution of 2-ethylpiperazine was replaced with an aqueous solution of N,N'-dicyclohexyl-1,2-ethanediamine. The membrane performances and membrane structure of the separation membrane obtained are shown in Table 2.

Example 10

A separation membrane was produced in the same manner as in Example 1, except that the trisodium phosphate was not added and the pH of the aqueous amine solution was adjusted to the pH shown in Table 1. The membrane performances and membrane structure of the separation membrane obtained are shown in Table 2.

Examples 11 and 12

Separation membranes were produced in the same manner as in Example 6, except that the pH of the aqueous amine solution was adjusted, by adding hydrochloric acid, to the pH values shown in Table 1. The membrane performances and membrane structure of each separation membrane obtained are shown in Table 2.

Example 13

A separation membrane was produced in the same manner as in Example 6, except that the concentration of trimesoyl chloride was adjusted to 0.05% by weight. The membrane performances and membrane structure of the separation membrane obtained are shown in Table 2.

Example 14

A separation membrane was produced in the same manner as in Example 6, except that the concentration of trimesoyl chloride was adjusted to 0.4% by weight. The membrane performances and membrane structure of the separation membrane obtained are shown in Table 2.

Example 15

A separation membrane was produced in the same manner as in Example 1, except that the 2.0% by weight aqueous solution of 2-ethylpiperazine was replaced with a 3.0% by weight aqueous solution of 2-methylpiperazine and that the concentration of trimesoyl chloride was changed to 0.3% by weight. The membrane performances and membrane structure of the separation membrane obtained are shown in Table 2.

Comparative Examples 1 to 4

Separation membranes were produced in the same manner as in Example 1, except that the membrane surface temperature during the contact between the amine and trimesoyl chloride and the membrane surface temperature during the interfacial polymerization were changed as shown in Table 1. The membrane performances and membrane structure of each separation membrane obtained are shown in Table 2.

Comparative Example 5

A separation membrane was produced in the same manner as in Example 1, except that the aqueous solution of 2-ethylpiperazine was replaced with an aqueous solution of piperazine. The membrane performances and membrane structure of the separation membrane obtained are shown in Table 2.

Comparative Example 6

A separation membrane was produced in the same manner as in Example 1, except that the 2.0% by weight aqueous solution of 2-ethylpiperazine was replaced with a 1.8% by weight aqueous solution of m-phenylenediamine and that the concentration of trimesoyl chloride was changed to 0.065% by weight. The membrane performances and membrane structure of the separation membrane obtained are shown in Table 2.

TABLE 1

| | Reaction conditions | | |
|---|---|---|---|
| | Membrane surface temperature during contact between amine and acid chloride (° C.) | Membrane surface temperature during interfacial polymerization (° C.) | Amine pH |
| Example 1 | 60.0 | 10.0 | 12.0 |
| Example 2 | 40.0 | 10.0 | 12.0 |
| Example 3 | 70.0 | 10.0 | 12.0 |
| Example 4 | 60.0 | −5.0 | 12.0 |
| Example 5 | 60.0 | 25.0 | 12.0 |
| Example 6 | 60.0 | 10.0 | 11.0 |
| Example 7 | 60.0 | 10.0 | 12.0 |
| Example 8 | 60.0 | 10.0 | 12.0 |
| Example 9 | 60.0 | 10.0 | 12.0 |
| Example 10 | 60.0 | 10.0 | 11.0 |
| Example 11 | 60.0 | 10.0 | 8.6 |
| Example 12 | 60.0 | 10.0 | 8.4 |
| Example 13 | 60.0 | 10.0 | 11.0 |
| Example 14 | 60.0 | 10.0 | 11.0 |
| Example 15 | 60.0 | 10.0 | 12.0 |
| Comparative Example 1 | 35.0 | 10.0 | 12.0 |
| Comparative Example 2 | 75.0 | 10.0 | 12.0 |
| Comparative Example 3 | 60.0 | −10.0 | 12.0 |
| Comparative Example 4 | 60.0 | 30.0 | 12.0 |
| Comparative Example 5 | 35.0 | 10.0 | 12.0 |
| Comparative Example 6 | 60.0 | 10.0 | 8.0 |

TABLE 2

| | Membrane performances | | | | | Membrane structure | |
|---|---|---|---|---|---|---|---|
| | MgSO$_4$ | | NaCl | | Selectivity | | |
| | Removal ratio (%) | Membrane permeation flux (m$^3$/m$^2$/d) | Removal ratio (%) | Membrane permeation flux (m$^3$/m$^2$/d) | for removal (divalent/ monovalent) | Poly-functional amine logP | zeta-potential (absolute value) pH 4 (mV) |
| Example 1 | 98.8 | 2.3 | 33.9 | 2.4 | 2.9 | −0.69 | 6.3 |
| Example 2 | 98.6 | 2.2 | 33.2 | 3.6 | 2.6 | −0.69 | 7.5 |

TABLE 2-continued

| | | | | | | | |
|---|---|---|---|---|---|---|---|
| Example 3 | 99.5 | 2.0 | 32.0 | 2.2 | 3.1 | −0.69 | 6.1 |
| Example 4 | 98.8 | 2.0 | 34.1 | 2.1 | 2.9 | −0.69 | 14.6 |
| Example 5 | 99.2 | 2.1 | 36.9 | 3.9 | 2.7 | −0.69 | 8.3 |
| Example 6 | 98.6 | 3.4 | 33.2 | 3.6 | 3.0 | −0.61 | 7.5 |
| Example 7 | 99.5 | 3.2 | 32.0 | 3.5 | 3.1 | −0.82 | 6.1 |
| Example 8 | 98.3 | 3.5 | 34.1 | 3.4 | 2.9 | −0.43 | 14.6 |
| Example 9 | 97.9 | 2.3 | 39.0 | 3.4 | 2.5 | −0.28 | 26.9 |
| Example 10 | 99.0 | 3.3 | 33.9 | 3.5 | 2.9 | −0.82 | 6.3 |
| Example 11 | 97.8 | 2.1 | 35.8 | 2.2 | 2.7 | −0.82 | 10.0 |
| Example 12 | 96.5 | 2.0 | 39.0 | 2.1 | 2.5 | −0.82 | 12.2 |
| Example 13 | 95.5 | 2.0 | 41.1 | 2.2 | 2.3 | −0.82 | 5.5 |
| Example 14 | 98.6 | 2.2 | 33.2 | 2.3 | 3.0 | −0.82 | 7.5 |
| Example 15 | 99.1 | 2.7 | 41.9 | 2.9 | 2.4 | −0.82 | 27.3 |
| Comparative Example 1 | 99.4 | 0.9 | 47.6 | 1.0 | 2.1 | −0.69 | 1.5 |
| Comparative Example 2 | 99.5 | 0.8 | 50.0 | 0.9 | 2.0 | −0.69 | 13.9 |
| Comparative Example 3 | 85.2 | 1.6 | 29.9 | 1.7 | 2.8 | −0.69 | 18.0 |
| Comparative Example 4 | 98.6 | 1.3 | 55.0 | 1.4 | 1.8 | −0.69 | 10.3 |
| Comparative Example 5 | 99.4 | 0.9 | 47.6 | 1.0 | 2.1 | −1.17 | 1.5 |
| Comparative Example 6 | 99.2 | 0.7 | 98.0 | 0.8 | 1.0 | −0.33 | 13.9 |

| | Membrane structure | | | |
|---|---|---|---|---|
| | zeta-potential (absolute value) pH 9 (mV) | Presence ratio by NMR | Hollow protuberant structure | Relative surface area |
| Example 1 | 15.1 | 0.92 | present | 3.24 |
| Example 2 | 15.7 | 0.94 | present | 2.67 |
| Example 3 | 16.6 | 0.91 | present | 1.95 |
| Example 4 | 11.0 | 0.12 | present | 1.60 |
| Example 5 | 15.2 | 0.99 | present | 2.14 |
| Example 6 | 15.7 | 0.94 | present | 3.36 |
| Example 7 | 16.6 | 0.91 | present | 3.05 |
| Example 8 | 11.0 | 0.12 | present | 3.64 |
| Example 9 | 11.8 | 1.29 | present | 2.80 |
| Example 10 | 15.1 | 0.98 | present | 3.24 |
| Example 11 | 16.2 | 0.90 | present | 2.21 |
| Example 12 | 25.2 | 0.86 | present | 1.67 |
| Example 13 | 14.4 | 0.96 | present | 1.84 |
| Example 14 | 15.7 | 0.94 | present | 1.75 |
| Example 15 | 23.9 | 1.24 | present | 3.29 |
| Comparative Example 1 | 20.3 | 0.77 | absent | 1.02 |
| Comparative Example 2 | 42.9 | 0.79 | absent | 1.06 |
| Comparative Example 3 | 31.2 | 0.71 | absent | 1.04 |
| Comparative Example 4 | 17.4 | 0.80 | absent | 1.03 |
| Comparative Example 5 | 20.3 | 0.77 | absent | 1.02 |
| Comparative Example 6 | 42.9 | 0.79 | present | 4.62 |

<Evaluation of Separation Membrane Elements>

(Production of Separation Membrane Elements)

Next, a permeation-side channel member was continuously superposed on the back-side surface of each separation membrane, and this stack was subjected to folding-and-cutting processing to thereby produce leaf-shaped separation membrane units each including the separation membrane and the permeation-side channel member. Subsequently, the separation membrane units and nets (thickness, 505 μm; pitch, 2.2 mm×2.2 mm) as a raw-water-side channel member were alternately superposed. Thereafter, the stack of the separation membrane units and the raw-water-side channel member was spirally wound around a collecting pipe to produce a separation membrane element.

(Thickness and Recess Depth of the Permeation-side Channel Member)

The thickness and recess depth of the permeation-side channel member were measured with high-precision shape analysis system KS-1100, manufactured by Keyence Corp. Specifically, high-precision shape analysis system KS-1100, manufactured by Keyence Corp., was used to determine an average difference in surface level from the results of an examination of an area of 5 cm×5 cm. Thirty (30) portions each having a difference in surface level of 10 μm or larger were examined, and the height values for these portions were summed up. The sum was divided by the number of the portions examined (30), and the value thus obtained was taken as the recess depth.

(Protrusion Width and Recess Groove Width of the Permeation-Side Channel Member)

The widths were measured using high-precision shape analysis system KS-1100, manufactured by Keyence Corp., in the same manner as for the thickness and protrusion height of the permeation-side channel member.

Example 16

The separation membrane obtained in Example 7 and tricot fabric (thickness, 250 μm; protrusion width, 300 μm; recess width, 360 μm; recess depth, 205 μm) as a permeation-side channel member were used to produce, by the method described above, a separation membrane element having an effective membrane area of 2.0 m$^2$, an outer diameter of 3.5 inches, and a length of 12 inches. Subsequently, this element was operated at 0.1 MPa, which is a lower-limit tap water feeding pressure, and a recovery ratio of 15% under the above-mentioned conditions concerning magnesium sulfate and sodium chloride. The results of the evaluation are shown in Table 3.

Example 17

The separation membrane obtained in Example 7 was used to produce, by the method described in Example 16, a separation membrane element having an effective membrane area of 0.5 m$^2$, an outer diameter of 1.8 inches, and a length of 12 inches. Subsequently, this element was operated at 0.3 MPa, which is an upper-limit tap water feeding pressure, under the above-mentioned conditions concerning magnesium sulfate and sodium chloride. The results of the evaluation are shown in Table 3.

Example 18

The element was evaluated in the same manner as in Example 17, except that the recovery ratio was changed to 40%. The results of the evaluation are shown in Table 3.

Example 19

A separation membrane element was produced and evaluated in the same manner as in Example 17, except that a permeation-side channel member configured of nonwoven fabric and projections formed thereon (thickness, 300 μm; protrusion width, 370 μm: recess width, 400 μm; recess depth, 230 μm) was used in place of the tricot fabric. The results of the evaluation are shown in Table 3.

The permeation-side channel member configured of nonwoven fabric and projections formed thereon was produced in the following manner. An applicator equipped with a comb-shaped shim having a slit width of 0.5 mm and a pitch of 0.9 mm was used to linearly apply pellets of a composition composed of 60% by weight highly crystalline polypropylene (MFR, 1,000 g/10 min; melting point, 161° C.) and 40% by weight lowly crystalline α-olefin-based polymer (lowly stereoregular polypropylene "L-MODU•S400" (trade name), manufactured by Idemitsu Kosan Co., Ltd.), to nonwoven fabric at a resin temperature of 205° C. and a running speed of 10 m/min, while regulating the temperature of the back-up roll to 20° C., so that the resultant projections extended perpendicularly to the longitudinal direction of the collecting pipe in the separation membrane element to be fabricated and perpendicularly to the longitudinal direction of the collecting pipe from the winding-direction inner end to the winding-direction outer end of the envelope-shaped membrane. The nonwoven fabric had a thickness of 0.07 mm, a basis weight of 35 g/m$^2$, and an embossed pattern (circular shape with a diameter of 1 mm; lattice pattern with a pitch of 5 mm).

Example 20

The element was evaluated in the same manner as in Example 19, except that the recovery ratio was changed to 40%. The results of the evaluation are shown in Table 3.

Comparative Example 7

A separation membrane element was produced and evaluated in the same manner as in Example 16, except that the separation membrane obtained in Comparative Example 5 was used. The results of the evaluation are shown in Table 3.

(Comparative Example 8)

A separation membrane element was produced and evaluated in the same manner as in Example 17, except that the separation membrane obtained in Comparative Example 5 was used. The results of the evaluation are shown in Table 3.

Comparative Example 9

The element was evaluated in the same manner as in Comparative Example 8, except that the recovery ratio was changed to 40%. The results of the evaluation are shown in Table 3.

TABLE 3

| | Effective membrane area (m²) | Operating pressure (MPa) | Recovery ratio (%) | MgSO₄ removal ratio (%) | NaCl removal ratio (%) | Rate of water production by element (L/min) |
|---|---|---|---|---|---|---|
| Example 16 | 2.0 | 0.1 | 15 | 98.1 | 37 | 1.12 |
| Example 17 | 0.5 | 0.3 | 15 | 98.3 | 38 | 1.08 |
| Example 18 | 0.5 | 0.3 | 40 | 98.0 | 37 | 1.00 |
| Example 19 | 0.5 | 0.3 | 15 | 98.3 | 38 | 1.18 |
| Example 20 | 0.5 | 0.3 | 40 | 98.0 | 37 | 1.15 |
| Comparative Example 7 | 2.0 | 0.1 | 15 | 98.9 | 44 | 0.31 |
| Comparative Example 8 | 0.5 | 0.3 | 15 | 99.2 | 46 | 0.29 |
| Comparative Example 9 | 0.5 | 0.3 | 40 | 95 | 36 | 0.18 |

As apparent from the results given in Table 2, the separation membranes of the present invention each have high permeability, a high divalent ion removal ratio, and high divalent/monovalent ion selectivity.

Furthermore, as apparent from Table 3, the water purifiers employing the separation membrane elements according to the present invention are each capable of supplying purified water at a rate of 1.0 L/min or higher without necessitating disposition of a booster pump or enlarging the element, and are capable of removing monovalent ions to an appropriate level and are also capable of removing most of salt ions having a valence of 2 or higher and other substances. These water purifiers hence have an advantage in that high-quality potable water from which contaminants, such as heavy metals and bacteria, have been removed while maintaining the tastiness inherent in water is obtained.

While the present invention has been described in detail and with reference to specific embodiments thereof, it will be apparent to one skilled in the art that various changes and modifications can be made therein without departing from the spirit and scope thereof. This application is based on a Japanese patent application filed on Jul. 31, 2015 (Application No. 2015-151733), a Japanese patent application filed on Mar. 30, 2016 (Application No. 2016-069547), and a Japanese patent application filed on Mar. 30, 2016 (Application No. 2016-069548), the contents thereof being incorporated herein by reference.

INDUSTRIAL APPLICABILITY

The separation membrane element of the present invention is especially suitable for use in domestic water purifiers for purifying tap water.

DESCRIPTION OF REFERENCE NUMERALS AND SIGNS

1 Collecting pipe
2 Separation membrane
3 End plate
4 Permeation-side channel member
5 Feed-side channel member
6 Leaf
7 Protrusion
8 Recess
H0 Thickness of permeation-side channel member
H1 Height of protrusion of permeation-side channel member
D Groove width
W Width of protrusion of permeation-side channel member
11 Raw water
12 Permeate
13 Concentrate
21 Service water pipeline
22 Feed valve
23 Water supply pipeline
24 Pretreatment filtration filter
25 Main-filtration-part filter
26 Check valve
27 Post-treatment filtration filter
28 Purified-water feed valve
29 Flow control valve
30 Purified-water pipeline
31 Concentrate pipeline
100 Separation membrane element

The invention claimed is:

1. A separation membrane comprising:
a supporting membrane; and
a separation functional layer formed on the supporting membrane,
wherein
the separation functional layer comprises a polymerized product of a polyfunctional amine with a polyfunctional acid halide,
the polyfunctional amine comprises as a main component one or more members of the group of 2-methylpiperazine, 2,6-dimethylpiperazine, 2,3,5-trimethylpiperazine, 2-ethylpiperazine, 2,5-diethylpiperazine, 2,3,5-triethylpiperazine, 2-n-propylpiperazine, 2,5-di-n-butylpiperazine, and bispiperidylpropane,
the separation functional layer has a hollow protuberant structure,
the separation functional layer has a relative surface area of 1.1 to 10.0, and
the separation functional layer has zeta-potentials respectively at pH 4 and pH 9, the absolute values of the zeta-potentials each being 20 mV or less.

2. The separation membrane according to claim 1, wherein the protuberant structure has an average number density of protuberances of 5-300 protuberances per $\mu m^2$.

3. The separation membrane according to claim 2, wherein the polyfunctional amine has a log P of −1.0 to 0.0.

4. The separation membrane according to claim 1, wherein, in the separation functional layer, amino groups and amide groups which are derived from the polyfunctional amine and carboxy groups and amide groups which are derived from the polyfunctional acid halide are present in a ratio that satisfies the following expression (2):

$$0.8 \leq \text{(number of moles of amino groups and amide groups derived from polyfunctional amine)} / \text{(number of moles of carboxy groups and amide groups derived from polyfunctional acid halide)} \leq 1.2 \quad (2).$$

5. The separation membrane according to claim 1, wherein the polyfunctional amine is at least one selected from the group consisting of 2-methylpiperazine, 2-ethylpiperazine, 2,5-diethylpiperazine, N,N'-dicyclohexyl-1,2-ethanediamine, and 2,5-dimethylpiperazine.

6. The separation membrane according to claim 1, wherein the separation functional layer has a relative surface area of 1.6 to 10.0.

7. A separation membrane element comprising:
a collecting pipe;
a separation membrane having a feed-side surface and a penetration-side surface;
a feed-side channel member disposed between portions of the feed-side surface of the separation membrane; and
a permeation-side channel member disposed between portions of the permeation-side surface of the separation membrane,
wherein the separation membrane is the separation membrane according to claim 1.

8. The separation membrane element according to claim 7, wherein in cases when saline water having a temperature of 25° C., a pH of 7, and an $MgSO_4$ concentration of 2,000 mg/L is used and filtrated so as to result in a recovery ratio of 15%, at a feeding pressure (MPa) which satisfies the following expression (3) concerning relationship with effective membrane area ($m^2$), then the filtration results in a permeate flow rate of 1.0 L/min or higher and an $MgSO_4$ removal ratio of 90% or higher.

(Effective membrane area ($m^2$))×(feeding pressure (MPa))≤0.3    (3)

9. The separation membrane element according to claim 7, wherein the effective membrane area is 0.3-3.0 $m^2$.

10. The separation membrane element according to claim 7, wherein the permeation-side channel member is either a sheet obtained by disposing projections on a porous sheet or a rugged sheet which has undergone ruggedness-imparting processing.

11. A water purifier comprising the separation membrane element according to claim 7.

12. A process for producing a separation membrane, the process comprising:
a formation step in which a separation functional layer is formed on a supporting membrane by interfacial polycondensation between an aqueous solution of a polyfunctional amine and a solution containing a polyfunctional acid halide,
the formation step comprising:
bringing into contact with each other the polyfunctional amine and the polyfunctional acid halide at a temperature of 60° C. to 70° C. for 0.1-10 seconds; and
reducing the temperature to 0° C. to 20° C. so as to allow further interfacial polycondensation with the polyfunctional amine and the polyfunctional acid halide,
wherein the polyfunctional amine comprises as a main component one or more members of the group of 2-methylpiperazine, 2,6-dimethylpiperazine, 2,3,5-trimethylpiperazine, 2-ethylpiperazine, 2,5-diethylpiperazine, 2,3,5-triethylpiperazine, 2-n-propylpiperazine, 2,5-di-n-butylpiperazine, and bispiperidylpropane.

13. The process for producing a separation membrane according to claim 12, wherein the aqueous solution of the polyfunctional amine has a pH of 8.5-11.0.

14. The process for producing a separation membrane according to claim 12, wherein the polyfunctional amine has a log P of −1.0 to 0.0.

* * * * *